United States Patent
Boloorian

(10) Patent No.: US 11,782,159 B2
(45) Date of Patent: Oct. 10, 2023

(54) LIDAR SYSTEM WITH ENCODED OUTPUT SIGNALS

(71) Applicant: SiLC Technologies, Inc., Monrovia, CA (US)

(72) Inventor: Majid Boloorian, San Diego, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 385 days.

(21) Appl. No.: 17/138,787

(22) Filed: Dec. 30, 2020

(65) Prior Publication Data

US 2022/0206149 A1 Jun. 30, 2022

(51) Int. Cl.
*G01C 3/08* (2006.01)
*G01S 17/58* (2006.01)
*G01S 7/4915* (2020.01)

(52) U.S. Cl.
CPC ............ *G01S 17/58* (2013.01); *G01S 7/4915* (2013.01)

(58) Field of Classification Search
None
See application file for complete search history.

(56) References Cited

U.S. PATENT DOCUMENTS

| 9,778,363 | B2 * | 10/2017 | Kadambi | G01S 17/32 |
| 2016/0274226 | A1 | 9/2016 | Ewis | |
| 2018/0224547 | A1 * | 8/2018 | Crouch | G01S 17/26 |
| 2019/0146074 | A1 | 5/2019 | Hjelmstad | |
| 2019/0353787 | A1 * | 11/2019 | Petit | G01S 7/484 |
| 2019/0361122 | A1 * | 11/2019 | Crouch | G01S 17/32 |
| 2022/0099837 | A1 * | 3/2022 | Crouch | G01S 17/931 |

FOREIGN PATENT DOCUMENTS

CN 110187350 A * 8/2019 ............. G01S 7/483

OTHER PUBLICATIONS

Matos, Taina, International Search Report and Written Opinion, PCT/US2021/061494, International Searching Authority, United States Patent and Trademark Office, dated Aug. 12, 2022.

* cited by examiner

*Primary Examiner* — Mark Hellner
(74) *Attorney, Agent, or Firm* — Gavrilovich, Dodd & Lindsey LLP

(57) ABSTRACT

The LIDAR system is encodes a system output signal with a binary code. Additionally, the LIDAR system identifies an amount of time between the binary code being transmitted from the LIDAR system and returning to the LIDAR system after being reflected by an object located outside of the LIDAR system.

17 Claims, 11 Drawing Sheets

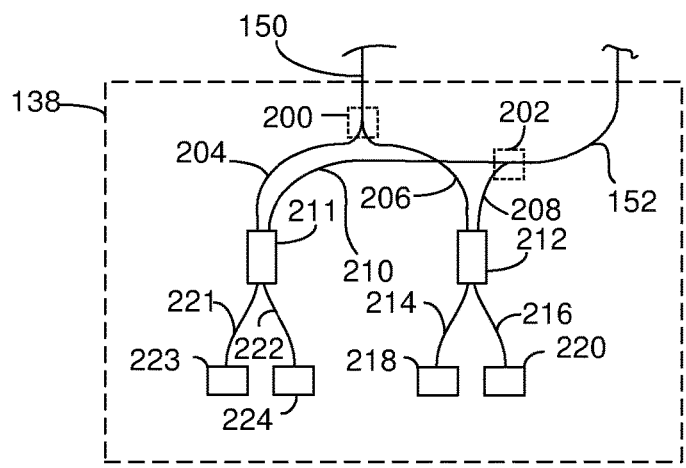
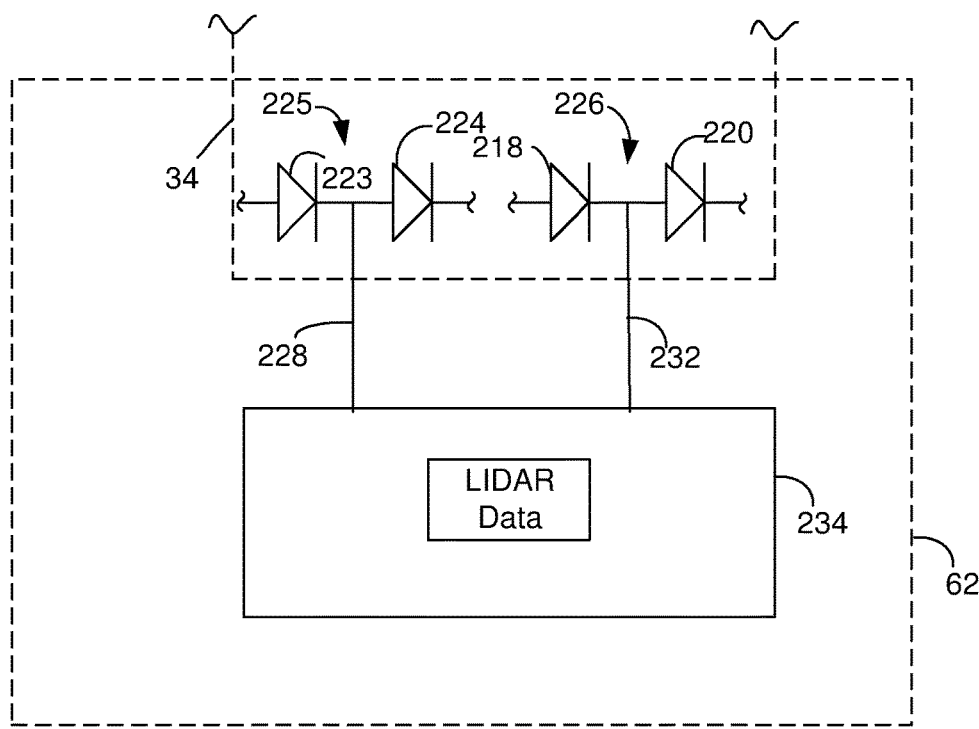
Figure 7A
Figure 7B

| $p_{1,1}$ associated with $s_{1,1}$ | $p_{1,2}$ associated with $s_{1,2}$ | $p_{2,1}$ associated with $s_{2,1}$ | $p_{2,2}$ associated with $s_{2,2}$ | $p_{3,1}$ associated with $s_{3,1}$ |
|---|---|---|---|---|
| 0  $d_{0,1}$  $d_{0,2}$  0 <br> 0  $f_1$  $f_2$  0 <br> ─────────── <br> $(f_1)(d_{0,2}) = v_{0,3}$ <br> 0  $d_{1,1}$  $d_{1,2}$  0 <br> 0  $f_1$  $f_2$  0 <br> ─────────── <br> $(d_{1,1})(f_2) = v_{1,1}$ | 0  $d_{1,1}$  $d_{1,2}$  0 <br> 0  $f_1$  $f_2$  0 <br> ─────────── <br> $d_{1,1}f_1 +$ <br> $d_{1,2}f_2 = v_{1,2}$ | 0  $d_{1,1}$  $d_{1,2}$  0 <br> 0  $f_1$  $f_2$  0 <br> ─────────── <br> $(f_1)(d_{1,2}) = v_{1,3}$ | | |
| | | 0  $d_{2,1}$  $d_{2,2}$  0 <br> 0  $f_1$  $f_2$  0 <br> ─────────── <br> $(d_{2,1})(f_2) = v_{2,1}$ | 0  $d_{2,1}$  $d_{2,2}$  0 <br> 0  $f_1$  $f_2$  0 <br> ─────────── <br> $d_{2,1}f_1 +$ <br> $d2_{,2}f_2 = v_{2,2}$ | 0  $d_{2,1}$  $d_{2,2}$  0 <br> 0  $f_1$  $f_2$  0 <br> ─────────── <br> $(f_1)(d_{2,2}) = v_{2,3}$ <br> 0  $d_{3,1}$  $d_{3,2}$  0 <br> 0  $f_1$  $f_2$  0 <br> ─────────── <br> $(d_{3,1})(f_2) = = v_{3,1}$ |
| $(d_{0,1})(d_{0,2}) +$ <br> $(d_{1,1})(d_{1,2}) = p_{1,1}$ | $d_{1,1}f_1 +$ <br> $d_{1,2}f_2 = p_{1,2}$ | $d_{1,2}f_1 +$ <br> $d_{2,1}f_2 = p_{2,1}$ | $d_{2,1}f_1 +$ <br> $d2_{,2}f_2 = p_{2,2}$ | $(f_1)(d_{2,2}) +$ <br> $(d_{3,1})(f_{,2}) =$ <br> $p_{3,1}$ |

Figure 7F

LIDAR SYSTEM WITH ENCODED OUTPUT SIGNALS

FIELD

The invention relates to optical devices. In particular, the invention relates to LIDAR systems.

BACKGROUND

"Time of flight" LIDAR systems are a type of LIDAR system that measures the time for a signal transmitted from the LIDAR system to return to the LIDAR system. "Time of flight" LIDAR systems require these signals be transmitted at undesirably high power levels. Additionally, "time of flight" LIDAR systems are sensitive to ambient light and light from other LIDAR systems.

Another type of LIDAR system is known as a Frequency Modulated Continuous Wave (FMCW) LIDAR system. In order to generate LIDAR data for a single region in a field of view, FMCW LIDAR systems need to transmit signals for undesirably long times. As a result, there is a need for LIDAR systems that allow LIDAR data to be generated while transmitting light at reduced power levels for reduced time periods.

SUMMARY

A LIDAR system has an output component that transmits a system output signal from the LIDAR system. The LIDAR system includes electronics that operate one or more components such that the system output signal carries a binary code. The electronics are also configured to identify an amount of time between the binary code being transmitted from the LIDAR system and returning to the LIDAR system after being reflected by an object located outside of the LIDAR system.

A LIDAR system encodes a system output signal with a binary code. Additionally, the LIDAR system identifies an amount of time between the binary code being transmitted from the LIDAR system and returning to the LIDAR system after being reflected by an object located outside of the LIDAR system.

A method of operating a LIDAR system includes encoding a system output signal with a binary code. The method also includes identifying an amount of time between the binary code being transmitted from the LIDAR system and returning to the LIDAR system after being reflected by an object located outside of the LIDAR system.

BRIEF DESCRIPTION OF THE FIGURES

FIG. 7A is a schematic of an example of a suitable processing unit for use in a LIDAR system.

FIG. 7B is a schematic of the relationship between the electronics and the light sensors in a processing unit.

FIG. 7F provides an example of a convolution.

DESCRIPTION

A LIDAR system outputs a system output signal that is encoded with a binary code. The LIDAR system also includes electronics that identify the time it takes for light from the system output signal to return to the LIDAR system after being reflected by an object located outside of the LIDAR system. The LIDAR system also includes electronics that use the identified time to generate LIDAR data that indicates the distance and/or radial velocity between the LIDAR system and the object. The amount of time that the system output signals need to be transmitted in order to generate the LIDAR data is much less than is required in FMCW systems. Additionally, the power level that is required by the system output signals is less than is required by time of flight LIDAR systems. As a result, LIDAR systems that use encoded system output signals provide LIDAR data more efficiently than prior LIDAR systems.

The system output signal can be encoded using differential phase keying. Differential phase keying can reduce the phase distortion that results from speckle. Accordingly, differential phase keying can reduce the effects of speckle. Further, when there is movement of the reflecting object relative to the LIDAR system, a sinusoid can be induced into the signals from which the LIDAR data is generated. The presence of this sinusoid increases the difficulty of identifying when the encoded system output signal has returned to the LIDAR system. However, the differential phase keying can eliminate this sinusoid from the signals from which the LIDAR data is generated. As a result, differential phase keying can enhance the reliability of the LIDAR data.

Further, when multiple LIDAR systems are present or when the LIDAR system outputs multiple different system output signals, encoding different system output signals with different codes can reduce interference from different sources.

Figure 1:
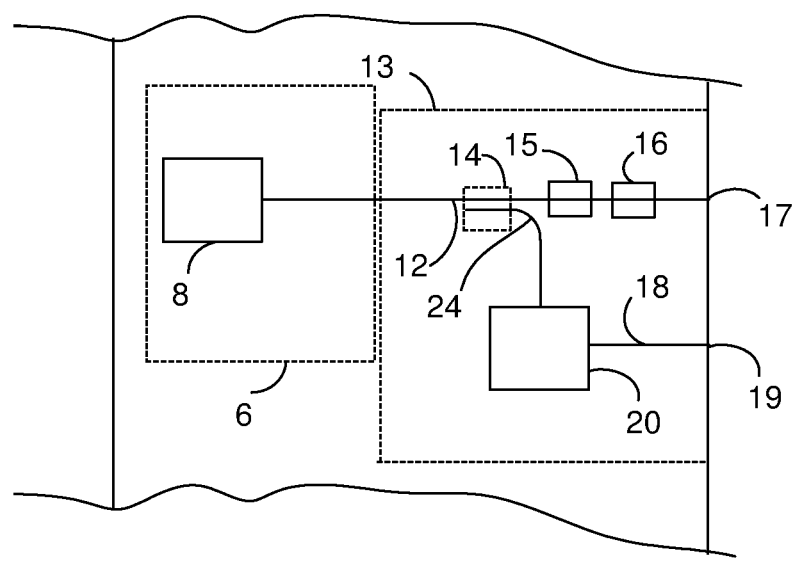
FIG. 1 is a topview of a schematic of a LIDAR chip that can serve as a LIDAR system or can be included in a LIDAR system that includes components in addition to the LIDAR chip.

FIG. 1 is a topview of a schematic of a LIDAR chip that can serve as a LIDAR system or can be included in a LIDAR system that includes components in addition to the LIDAR chip. The LIDAR chip can include a Photonic Integrated Circuit (PIC) and can be a Photonic Integrated Circuit chip. The LIDAR chip includes a light system 6 that outputs a modulated light system signal on a utility waveguide. The illustrated light system 6 includes a light source 8 that outputs a light system signal. A suitable light source 8 includes, but is not limited to, coherent light sources including semiconductor lasers such as External Cavity Lasers (ECLs), Distributed Feedback lasers (DFBs), Discrete Mode (DM) lasers, Quantum Dot (QD) lasers and Distributed Bragg Reflector lasers (DBRs).

The LIDAR chip includes a utility waveguide 12 that receives the light system signal from the light source 8. The utility waveguide 12 carries the modulated light system signal to a LIDAR engine 13 that processes the light signals from which the LIDAR data is generated. The LIDAR engine 13 includes a splitter 14 positioned along the utility waveguide 12. The splitter 14 receives the modulated light system signal and outputs an outgoing signal on the utility waveguide 12.

A phase modulator 15 is positioned along the utility waveguide 12 and is configured to modulate the phase of the outgoing signal such that the phase modulator 15 outputs a modulated outgoing signal carried on the utility waveguide 12. Suitable phase modulators 15 include, but are not limited to, PIN diodes operated in forward bias (carrier injection) mode, PN diodes operated in reverse bias (depletion) mode and devices based on electro-optic materials such as lithium niobate, and III-V based active devices such as semiconductor optical amplifiers (SOA).

An intensity modulator 16 is optionally positioned along the utility waveguide 12 and is configured to modulate the intensity of the modulated outgoing signal and output the result on the utility waveguide 12 as an outgoing LIDAR signal. The intensity modulator 16 can be configured to pass the outgoing LIDAR signal on the utility waveguide 12 without substantial attenuation or to attenuate the outgoing LIDAR signal. In some instances, the intensity modulator is configured to pass the outgoing LIDAR signal on the utility waveguide 12 as the LIDAR output signal without substantial attenuation and/or to attenuate the outgoing LIDAR signal such that a light signal is not output on the utility waveguide 12 or is effectively not output a light signal on the utility waveguide 12. Suitable intensity modulators 16 include, but are not limited to, PIN diodes operated in forward bias (carrier injection) mode, PN diodes operated in reverse bias (depletion) mode and devices based on electro-optic materials such as lithium niobate.

The LIDAR engine 13 includes a facet 17 at which the utility waveguide 12 terminates. The utility waveguide 12 carries the outgoing LIDAR signal to the facet 17. The facet 17 can be positioned such that the outgoing LIDAR signal traveling through the facet 17 exits the LIDAR chip and serves as a LIDAR output signal. For instance, the facet 17 can be positioned at an edge of the chip so the outgoing LIDAR signal traveling through the facet 17 exits the chip and serves as the LIDAR output signal. In some instances, the portion of the LIDAR output signal that has exited from the LIDAR chip can also be considered a system output signal. As an example, when the exit of the LIDAR output signal from the LIDAR chip is also an exit of the LIDAR output signal from the LIDAR system, the LIDAR output signal can also be considered a system output signal.

Light from the LIDAR output signal travels away from the LIDAR system in the system output signal. The system output signal can to through free space in the atmosphere in which the LIDAR system is positioned. The system output signal may be reflected by one or more objects in the path of the system output signal. When the system output signal is reflected, at least a portion of the reflected light travels back toward the LIDAR chip as a system input signal.

Light from the system return signal can be carried in a first LIDAR input signal that is received by the LIDAR chip. In some instances, a portion of the system return signal can serve as the first LIDAR input signal. The LIDAR engine 13 includes a comparative waveguide 18 that terminates at a facet 19. The first LIDAR input signals enters the comparative waveguide 18 through the facet 19 and serves as a first comparative signal. The comparative waveguide 18 carries the first comparative signal to a processing unit 20 configured to convert the optical signals to electrical signals from which LIDAR data (the radial velocity and/or distance between the LIDAR system and one or more objects located outside of the LIDAR system) is generated.

The splitter 14 moves a portion of the light system signal from the utility waveguide 12 onto a reference waveguide 24 as a first reference signal. The reference waveguide 24 carries the first reference signal to the processing unit 20 for further processing.

The percentage of light transferred from the utility waveguide 12 by the splitter 14 can be fixed or substantially fixed. For instance, the splitter 14 can be configured such that the power of the first reference signal transferred to the reference waveguide 24 is a percentage of the power of the light system signal. In some instances, the percentage is greater than 5%, 10% or 20 and/or less than 50%, or 60%. Suitable splitters 22 include, but are not limited to, optical couplers, y-junctions, tapered couplers, and Multi-Mode Interference (MMI) devices.

Figure 2:
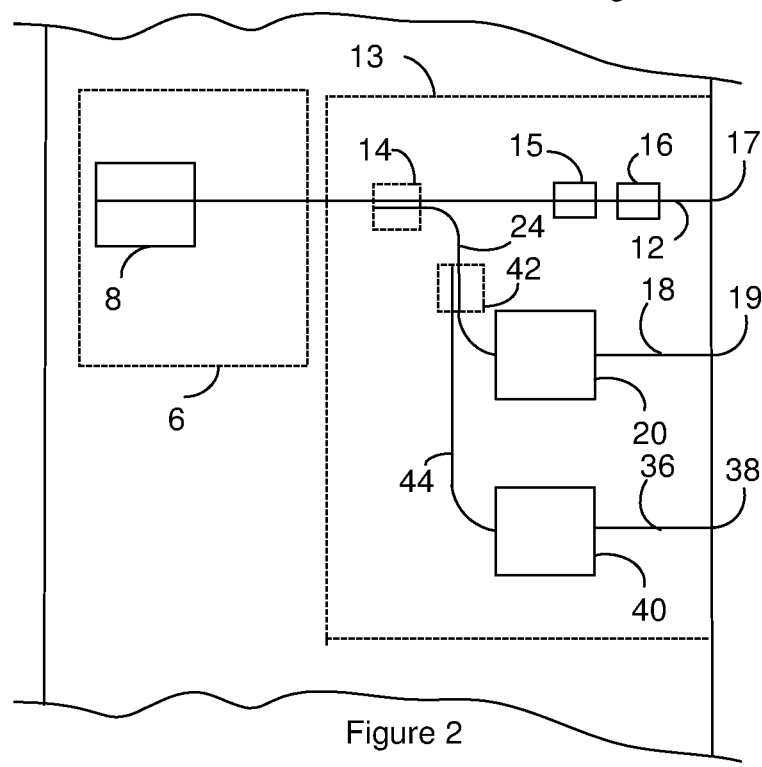
FIG. 2 is a topview of a schematic of another embodiment of a LIDAR chip that can serve as a LIDAR system or can be included in a LIDAR system that includes components in addition to the LIDAR chip.

FIG. 2 is a topview of a schematic of a LIDAR chip that can serve as a LIDAR system or can be included in a LIDAR system that includes components in addition to the LIDAR chip. The LIDAR chip of FIG. 2 illustrates the LIDAR chip of FIG. 1 modified to process multiple LIDAR input signals. As noted above, when the light from the system output signal is reflected by an object located outside of the LIDAR system, at least a portion of the reflected light can travel back toward the LIDAR chip in the system return signal.

Light from the system return signal can be carried in a second system LIDAR input signal that is received by the LIDAR chip. In some instances, a portion of the system return signal can serve as a second LIDAR input signal. The LIDAR chip includes a second comparative waveguide 36 that terminates at a facet 38. The second LIDAR input signals enters the second comparative waveguide 36 through the facet 38 and serves as a second comparative signal. The second comparative waveguide 36 carries the second comparative signal to a second processing unit 40 configured to convert the optical signals to electrical signals from which LIDAR data (the radial velocity and/or distance between the LIDAR system and one or more objects located outside of the LIDAR system) is generated.

The reference waveguide 24 carries the first reference signal to a splitter 42. The splitter 42 moves a portion of the outgoing LIDAR signal from the reference waveguide 24 onto a second reference waveguide 44 as a second reference signal. The second reference waveguide 44 carries the second reference signal to the second processing unit 40 for further processing.

As will be described in more detail below, the first processing unit 20 and the second processing unit 40 each combines a comparative signal with a reference signal to form a composite signal that carries LIDAR data for a sample region on the field of view. Accordingly, the composite signal can be processed so as to extract LIDAR data (one or more data selected from the group consisting of one or more reflecting object material indicators, radial velocity between the LIDAR system and an object external to the LIDAR system, and distance between the LIDAR system and the object) for the sample region.

In some instances, a LIDAR chip constructed according to FIG. 1 or FIG. 2 is used in conjunction with a LIDAR adapter. In some instances, the LIDAR adapter can be physically and optically positioned between the LIDAR chip and the one or more reflecting objects and/or the field of view in that an optical path that the first LIDAR input signal(s) and/or the LIDAR output signal travels from the LIDAR chip to the field of view passes through the LIDAR adapter. Additionally, the LIDAR adapter can be configured to operate on the system return signal and the LIDAR output signal such that the first LIDAR input signal and the LIDAR output signal travel on different optical pathways between the LIDAR adapter and the LIDAR chip but on the same optical pathway between the LIDAR adapter and a reflecting object in the field of view. Additionally or alternately, the LIDAR adapter can be configured to operate on the system return signal and the LIDAR output signal such that the second LIDAR input signal and the LIDAR output signal travel on different optical pathways between the LIDAR adapter and the LIDAR chip but on the same optical pathway between the LIDAR adapter and a reflecting object in the field of view.

Figure 3:
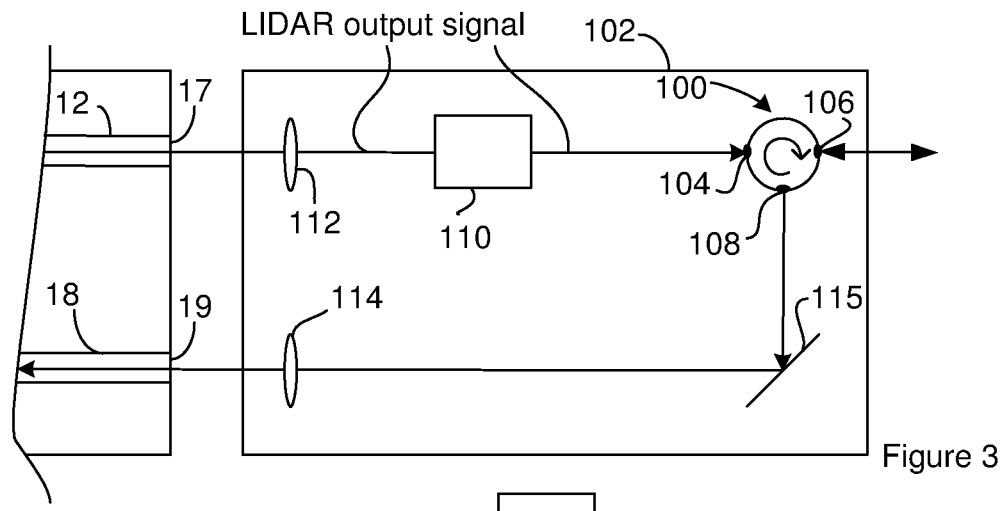
FIG. 3 is a topview of an example of a LIDAR adapter that is suitable for use with the LIDAR chip of FIG. 1.

An example of a LIDAR adapter that is suitable for use with the LIDAR chip of FIG. 1 is illustrated in FIG. 3. The LIDAR adapter includes multiple components positioned on a base. For instance, the LIDAR adapter includes a circulator 100 positioned on a base 102. The illustrated optical circulator 100 includes three ports and is configured such that light entering one port exits from the next port. For instance, the illustrated optical circulator includes a first port 104, a second port 106, and a third port 108. The LIDAR output signal enters the first port 104 from the utility waveguide 12 of the LIDAR chip and exits from the second port 106 as an assembly output signal.

The assembly output signal includes, consists of, or consists essentially of light from the LIDAR output signal received from the LIDAR chip. Accordingly, the assembly output signal may be the same or substantially the same as the LIDAR output signal received from the LIDAR chip. However, there may be differences between the assembly output signal and the LIDAR output signal received from the LIDAR chip. For instance, the LIDAR output signal can experience optical loss as it travels through the LIDAR adapter and/or the LIDAR adapter can optionally include an amplifier 110 configured to amplify the LIDAR output signal as it travels through the LIDAR adapter.

When one or more objects in the sample region reflect light from the assembly output signal, at least a portion of the reflected light travels back to the circulator 100 as an assembly return signal. At least a portion of the light from the assembly return signal enters the circulator 100 through the second port 106. FIG. 3 illustrates the LIDAR output signal and the assembly return signal traveling between the LIDAR adapter and the sample region along the same optical path.

The assembly return signal exits the circulator 100 through the third port 108 and is directed to the input waveguide 16 on the LIDAR chip. Accordingly, light from the assembly returned signal can serve as the first LIDAR input signal and the first LIDAR input signal includes or consists of light from the assembly return signal. Accordingly, the LIDAR output signal and the first LIDAR input signal travel between the LIDAR adapter and the LIDAR chip along different optical paths.

As is evident from FIG. 3, the LIDAR adapter can optionally include optical components in addition to the circulator 100. For instance, the LIDAR adapter can include components for directing and controlling the optical path of the LIDAR output signal and the LIDAR return signal. As an example, the adapter of FIG. 3 includes an optional amplifier 110 positioned so as to receive and amplify the LIDAR output signal before the LIDAR output signal enters the circulator 100. The amplifier 110 can be operated by electronics 62 allowing the electronics 62 to control the power of the LIDAR output signal.

The optical components can include one or more beam-shaping components. For instance, FIG. 3 illustrates the LIDAR adapter including an optional first lens 112 and an optional second lens 114. The first lens 112 can be configured to couple the LIDAR output signal to a desired location. In some instances, the first lens 112 is configured to focus or collimate the LIDAR output signal at a desired location. In one example, the first lens 112 is configured to couple the LIDAR output signal on the first port 104 when the LIDAR adapter does not include an amplifier 110. As another example, when the LIDAR adapter includes an amplifier 110, the first lens 112 can be configured to couple the LIDAR output signal on the entry port to the amplifier 110. The second lens 114 can be configured to couple the LIDAR output signal at a desired location. In some instances, the second lens 114 is configured to focus or collimate the LIDAR output signal at a desired location. For instance, the second lens 114 can be configured to couple the LIDAR output signal on the facet 19 of the input waveguide 16.

The LIDAR adapter can also include one or more direction changing components such as mirrors or prisms. FIG. 3 illustrates the LIDAR adapter including a mirror 115 as a direction-changing component 115 that redirects the LIDAR return signal from the circulator 100 to the facet 19 of the input waveguide 16.

Figure 4:
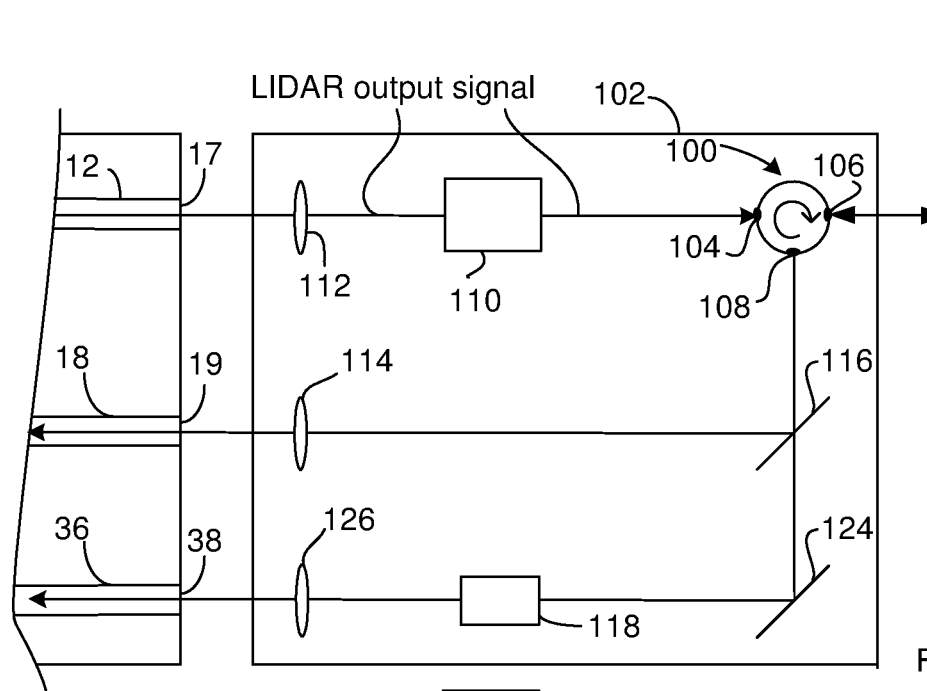
FIG. 4 is a topview of an example of a LIDAR adapter that is suitable for use with the LIDAR chip of FIG. 2.

FIG. 4 illustrates the LIDAR system of FIG. 3 modified such that the LIDAR adapter is suitable for use with the LIDAR chip of FIG. 2. Light from the light system 6 is typically linearly polarized. Accordingly, the typical system output signal carries light of a primary or exclusive polarization state. Reflection of a system output signal can change the polarization state of all or a portion of the system output signal. In some instances, the LIDAR system of FIG. 4 is operated to compensate for the change in polarization state caused by this reflection.

The LIDAR adapter of FIG. 4 includes a polarization splitter 116 that receives the assembly return signal from the circulator 100. The polarization splitter 116 splits the assembly return signal into a first return signal and a second return signal. The first return signal is directed to the input waveguide 16 on the LIDAR chip and serves as the first LIDAR input signal described in the context of FIG. 1. The second return signal is directed a polarization rotator 118. The polarization rotator 118 outputs a second LIDAR input signal that is directed to the second comparative waveguide 36 on the LIDAR chip and serves as the second LIDAR input signal.

One example of a polarization splitter 116 is constructed such that the first return signal has a first polarization state but does not have or does not substantially have a second polarization state and the second return signal has a second polarization state but does not have or does not substantially have the first polarization state. The first polarization state and the second polarization state can be linear polarization states and the second polarization state is different from the first polarization state. For instance, the first polarization state can be TE and the second polarization state can be TM or the first polarization state can be TM and the second polarization state can be TE. In some instances, the light system can linearly polarized such that the LIDAR output signal has the first polarization state. Suitable polarization splitters 116 include, but are not limited to, Wollaston prisms, and MEMs-based polarizing beamsplitters.

A polarization rotator can be configured to change the polarization state of the first portion of the system return signal and/or the second portion of the system return signal. For instance, the polarization rotator 118 shown in FIG. 4 can be configured to change the polarization state of the second portion of the system return signal from the second polarization state to the first polarization state. As a result, the second LIDAR input signal has the first polarization state but does not have or does not substantially have the second polarization state. Accordingly, the first LIDAR input signal and the second LIDAR input signal each have the same polarization state (the first polarization state in this example). Despite carrying light of the same polarization state, the first LIDAR input signal and the second LIDAR input signal are associated with different polarization states as a result of the use of the polarizing beamsplitter. For instance, the first LIDAR input signal carries the light reflected with the first polarization state and the second LIDAR input signal carries the light reflected with the second polarization state. As a result, the first LIDAR input signal is associated with the first polarization state and the second LIDAR input signal is associated with the second polarization state.

Since the first LIDAR input signal and the second LIDAR input signal carry light of the same polarization state, the comparative signals that result from the first LIDAR input signal have the same polarization state as the comparative signals that result from the second LIDAR input signal. As a result, the polarization rotator 118 is arranged such that the comparative signals that result from the first LIDAR input signal and the first reference signals have the same polarization state and the comparative signals that result from the second LIDAR input signal and the second reference signals have the same polarization state. This result can be achieved with other arrangements of the components in the LIDAR system. For instance, the polarization rotator 118 can be positioned to rotate the polarization state of the second reference signal rather than the polarization state of the second portion of the system return signal.

Suitable polarization rotators 118 include, but are not limited to, rotation of polarization-maintaining fibers, Faraday rotators, half-wave plates, MEMs-based polarization rotators and integrated optical polarization rotators using asymmetric y-branches, Mach-Zehnder interferometers and multi-mode interference couplers.

Since the outgoing LIDAR signal is linearly polarized, the first reference signals can have the same linear polarization state as the second reference signals. Additionally, the components on the LIDAR adapter can be selected such that the first reference signals, the second reference signals, the comparative signals and the second comparative signals each have the same polarization state. In the example disclosed in the context of FIG. 4, the first comparative signals, the second comparative signals, the first reference signals, and the second reference signals can each have light of the first polarization state.

The LIDAR adapter of FIG. 4 can include additional optical components including passive optical components. For instance, the LIDAR adapter can include a beam-shaping component(s) such as an optional third lens 126. The third lens 126 can be configured to couple the second LIDAR output signal at a desired location. In some instances, the third lens 126 focuses or collimates the second LIDAR output signal at a desired location. For instance, the third lens 126 can be configured to focus or collimate the second LIDAR output signal on the facet 38 of the second comparative waveguide 36. The LIDAR adapter also includes one or more direction changing components 124 such as mirrors and prisms. FIG. 4 illustrates the LIDAR adapter including a mirror 124 as a direction-changing component that redirects the second return signal from the circulator 100 to the facet 38 of the second comparative waveguide 36 and/or to the third lens 126.

The LIDAR chips include one or more waveguides that constrains the optical path of one or more light signals. While the LIDAR adapter can include waveguides, the optical path that the signals travel between components on the LIDAR adapter and/or between the LIDAR chip and a component on the LIDAR adapter can be free space. For instance, the signals can travel through the atmosphere in which the LIDAR chip, the LIDAR adapter, and/or the base 102 is positioned when traveling between the different components on the LIDAR adapter and/or between a component on the LIDAR adapter and the LIDAR chip. As a result, the components on the adapter can be discrete optical components that are attached to the base 102.

Figure 5:
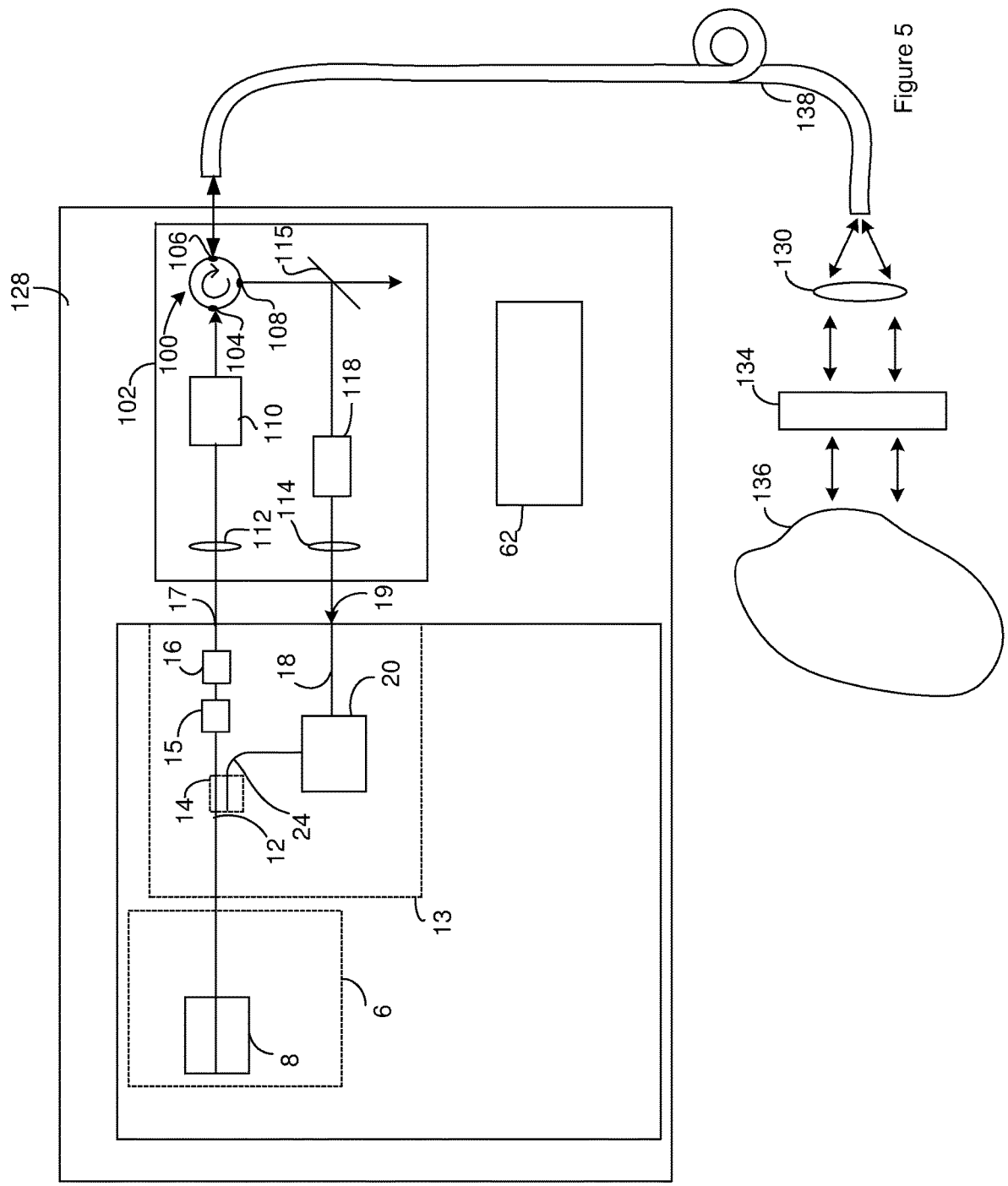
FIG. 5 is a topview of a LIDAR system that includes the LIDAR chip of FIG. 1 and the LIDAR adapter of FIG. 3 on a common mount.

When the LIDAR system includes a LIDAR chip and a LIDAR adapter, the LIDAR chip, electronics, and the LIDAR adapter can be included in a LIDAR assembly where the LIDAR chip, the LIDAR adapter, and all or a portion of the electronics are positioned on a common mount 128. Suitable common mounts 128 include, but are not limited to, glass plates, metal plates, silicon plates and ceramic plates. As an example, FIG. 5 is a topview of a LIDAR system that includes the LIDAR chip and electronics 62 of FIG. 1 and the LIDAR adapter of FIG. 3 on a common mount 128. As another example, FIG. 6 is a topview of a LIDAR system that includes the LIDAR chip and electronics 62 of FIG. 2 and the LIDAR adapter of FIG. 4 on a common mount 128.

Figure 6:
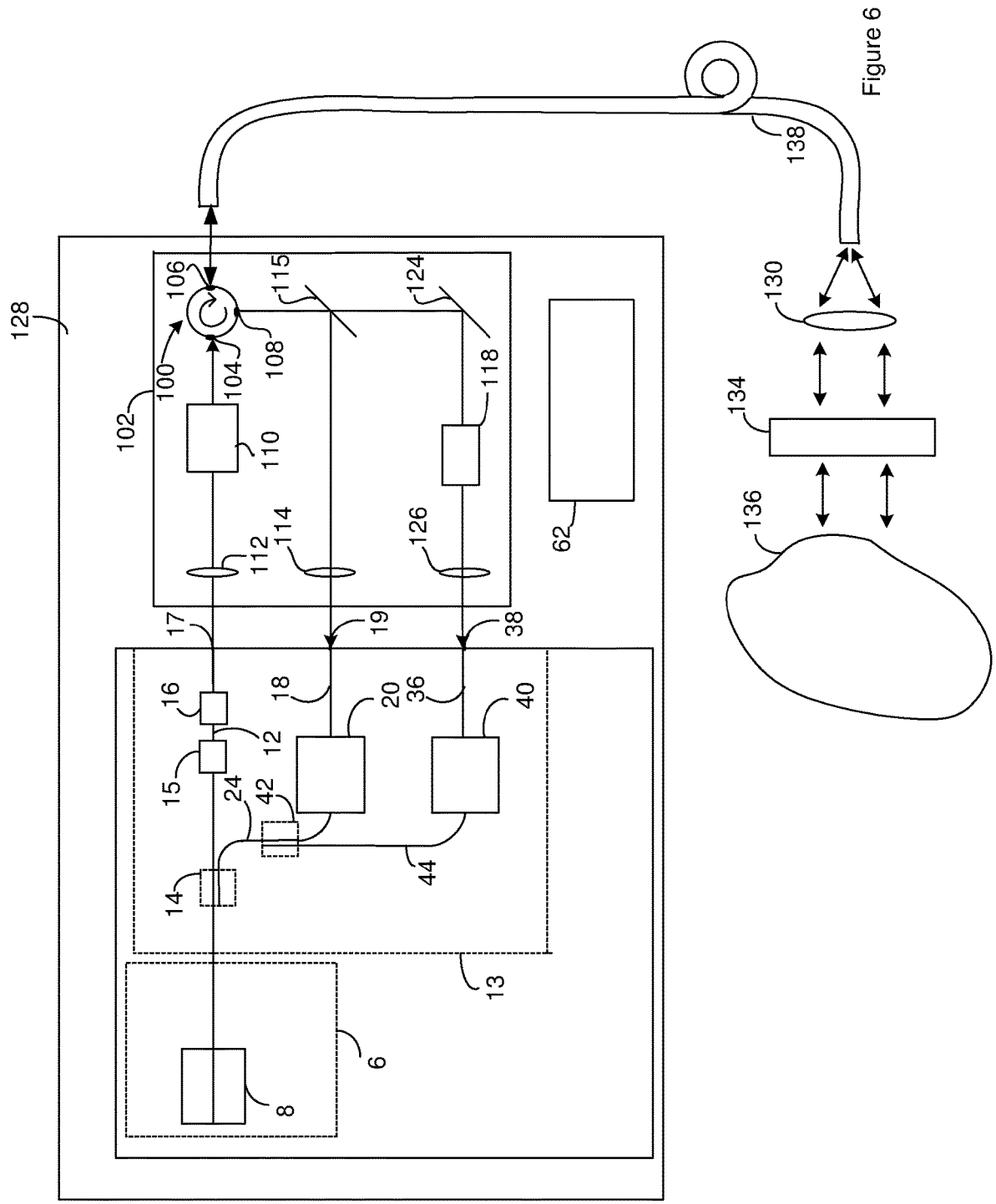
FIG. 6 is a topview of a LIDAR system that includes the LIDAR chip of FIG. 2 and the LIDAR adapter of FIG. 4 on a common mount.

Although FIG. 5 and FIG. 6 illustrate the electronics 62 as located on the common mount 128, all or a portion of the electronics can be located off the common mount 128. When the light system 6 is located off the LIDAR chip, the light system can be located on the common mount 128 or off of the common mount 128. Suitable approaches for mounting the LIDAR chip, electronics, and/or the LIDAR adapter on the common mount 128 include, but are not limited to, epoxy, solder, and mechanical clamping.

The LIDAR systems of FIG. 5 and FIG. 6 can include one or more system components that are at least partially located off the common mount 128. Examples of suitable system components include, but are not limited to, optical links, beam-shaping components, polarization state rotators, beam steering components, optical splitters, optical amplifiers, and optical attenuators. For instance, the LIDAR systems of FIG. 5 and FIG. 6 can include one or more beam-shaping components 130 that receive the assembly output signal from the adapter and output a shaped signal. The one or more beam-shaping components 130 can be configured to provide the shaped signal with the desired shape. For instance, the one or more beam-shaping components 130 can be configured to output a shaped signal that focused, diverging or collimated. In FIG. 5 and FIG. 6, the one or more beam-shaping components 130 is a lens that is configured to output a collimated shaped signal.

The LIDAR systems of FIG. 5 and FIG. 6 can optionally include one or more beam steering components 134 that receive the shaped signal from the one or more beam-shaping components 130 and that output the system output signal. For instance, FIG. 5 and FIG. 6 illustrates a beam steering component 134 that receive the shaped signal from a beam-shaping component 130. The electronics can operate the one or more beam steering components 134 so as to steer the system output signal to different sample regions 135. The sample regions can extend away from the LIDAR system to a maximum distance for which the LIDAR system is configured to provide reliable LIDAR data. The sample regions can be stitched together to define the field of view. For instance, the field of view of for the LIDAR system includes or consists of the space occupied by the combination of the sample regions.

Suitable beam steering components include, but are not limited to, movable mirrors, MEMS mirrors, optical phased arrays (OPAs), optical gratings, actuated optical gratings and actuators that move the LIDAR chip, LIDAR adapter, and/or common mount 128.

When the system output signal is reflected by an object 136 located outside of the LIDAR system and the LIDAR, at least a portion of the reflected light returns to the LIDAR system as a system return signal. When the LIDAR system includes one or more beam steering components 134, the one or more beam steering components 134 can receive at least a portion of the system return signal from the object 136. The one or more beam-shaping components 130 can receive at least a portion of the system return signal from the object 136 or from the one or more beam steering components 134 and can output the assembly return signal that is received by the adapter.

The LIDAR systems of FIG. 5 and FIG. 6 include an optional optical link 138 that carries optical signals to the one or more system components from the adapter, from the LIDAR chip, and/or from one or more components on the common mount. For instance, the LIDAR systems of FIG. 5 and FIG. 6 include an optical fiber configured to carry the assembly output signal to the beam-shaping components 130. The use of the optical link 138 allows the source of the system output signal to be located remote from the LIDAR chip. Although the illustrated optical link 138 is an optical fiber, other optical links 138 can be used. Other suitable optical links 138 include, but are not limited to, free space optical links and waveguides. When the LIDAR system excludes an optical link, the one or more beam-shaping components 130 can receive the assembly output signal directly from the adapter.

The above LIDAR systems includes a variety of optical components that can serve as output components through which the system output signal exits the LIDAR system. In some instances, depending on the configuration of the LIDAR system, a beam steering component 134, a beam-shaping component 130, a facet of an optional optical link 138 such as an optical fiber, a port of a circulator 100, or a facet of a utility waveguide can serve as an output component. In some instances, the output component also serves as an input component through which a system return enters the LIDAR system. For instance, in some instances, depending on the configuration of the LIDAR system, a beam steering component 134, a beam-shaping component 130, a facet of an optional optical link 138 such as an optical fiber, a port of a circulator 100, or a facet of a utility waveguide can serve as an input component.

FIG. 7A through FIG. 7B illustrate an example of a processing unit 138 that is suitable for use as the processing unit 20 and/or the processing unit 40 in the above LIDAR systems. The processing unit 138 receives a comparative signal contribution from a comparative waveguide 150 and a reference signal contribution from a reference waveguide 152. The comparative waveguide 150 in FIG. 7A can represent the comparative waveguide 18 of FIG. 1 while the reference waveguide 152 in FIG. 7A is the reference waveguide 24 of FIG. 1. Alternately, the comparative waveguide 150 in FIG. 7A can represent the comparative waveguide 18 of FIG. 2 while the reference waveguide 152 in FIG. 7A is the reference waveguide 24 of FIG. 2. Accordingly, the processing units 138 can receive the first comparative signal as the comparative signal contribution and the first reference signal as the reference signal contribution. Alternately, the comparative waveguide 150 in FIG. 7A can represent the second comparative waveguide 36 of FIG. 2 while the reference waveguide 152 in FIG. 7A represents the second reference waveguide 44 of FIG. 2. Accordingly, the processing units 138 can receive the second comparative signal as the comparative signal contribution and the second reference signal as the reference signal contribution.

The processing unit includes a second splitter 200 that divides the comparative signal carried on the comparative waveguide 150 onto a first comparative waveguide 204 and a second comparative waveguide 206. The first comparative waveguide 204 carries a first portion of the comparative signal to a first light-combining component 211. The second comparative waveguide 206 carries a second portion of the comparative signal to a second light-combining component 212.

The processing component includes a first splitter 202 that divides the reference signal carried on the reference waveguide 152 onto a first reference waveguide 210 and a second reference waveguide 208. The first reference waveguide 210 carries a first portion of the reference signal to the first light-combining component 211. The second reference waveguide 208 carries a second portion of the reference signal to the second light-combining component 212.

The second light-combining component 212 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal.

The second light-combining component 212 also splits the resulting second composite signal onto a first auxiliary detector waveguide 214 and a second auxiliary detector waveguide 216. The first auxiliary detector waveguide 214 carries a first portion of the second composite signal to a first auxiliary light sensor 218 that converts the first portion of the second composite signal to a first auxiliary electrical signal. The second auxiliary detector waveguide 216 carries a second portion of the second composite signal to a second auxiliary light sensor 220 that converts the second portion of the second composite signal to a second auxiliary electrical signal. Examples of suitable light sensors include germanium photodiodes (PDs), and avalanche photodiodes (APDs).

In some instances, the second light-combining component 212 splits the second composite signal such that the portion of the comparative signal (i.e. the portion of the second portion of the comparative signal) included in the first portion of the second composite signal is phase shifted by 180° relative to the portion of the comparative signal (i.e. the portion of the second portion of the comparative signal) in the second portion of the second composite signal but the portion of the reference signal (i.e. the portion of the second portion of the reference signal) in the second portion of the second composite signal is not phase shifted relative to the portion of the reference signal (i.e. the portion of the second portion of the reference signal) in the first portion of the second composite signal. Alternately, the second light-combining component 212 splits the second composite signal such that the portion of the reference signal (i.e. the portion of the second portion of the reference signal) in the first portion of the second composite signal is phase shifted by 180° relative to the portion of the reference signal (i.e. the portion of the second portion of the reference signal) in the second portion of the second composite signal but the portion of the comparative signal (i.e. the portion of the second portion of the comparative signal) in the first portion of the second composite signal is not phase shifted relative to the portion of the comparative signal (i.e. the portion of the second portion of the comparative signal) in the second portion of the second composite signal. Examples of suitable light sensors include germanium photodiodes (PDs), and avalanche photodiodes (APDs).

The first light-combining component 211 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal.

The first light-combining component 211 also splits the first composite signal onto a first detector waveguide 221 and a second detector waveguide 222. The first detector waveguide 221 carries a first portion of the first composite signal to a first light sensor 223 that converts the first portion of the second composite signal to a first electrical signal. The second detector waveguide 222 carries a second portion of the second composite signal to a second auxiliary light sensor 224 that converts the second portion of the second composite signal to a second electrical signal. Examples of suitable light sensors include germanium photodiodes (PDs), and avalanche photodiodes (APDs).

In some instances, the first light-combining component 211 splits the first composite signal such that the portion of the comparative signal (i.e. the portion of the first portion of the comparative signal) included in the first portion of the composite signal is phase shifted by 180° relative to the portion of the comparative signal (i.e. the portion of the first portion of the comparative signal) in the second portion of the composite signal but the portion of the reference signal (i.e. the portion of the first portion of the reference signal) in the first portion of the composite signal is not phase shifted relative to the portion of the reference signal (i.e. the portion of the first portion of the reference signal) in the second portion of the composite signal. Alternately, the first light-combining component 211 splits the composite signal such that the portion of the reference signal (i.e. the portion of the first portion of the reference signal) in the first portion of the composite signal is phase shifted by 180° relative to the portion of the reference signal (i.e. the portion of the first portion of the reference signal) in the second portion of the composite signal but the portion of the comparative signal (i.e. the portion of the first portion of the comparative signal) in the first portion of the composite signal is not phase shifted relative to the portion of the comparative signal (i.e. the portion of the first portion of the comparative signal) in the second portion of the composite signal.

When the second light-combining component 212 splits the second composite signal such that the portion of the comparative signal in the first portion of the second composite signal is phase shifted by 180° relative to the portion of the comparative signal in the second portion of the second composite signal, the first light-combining component 211 also splits the composite signal such that the portion of the comparative signal in the first portion of the composite signal is phase shifted by 180° relative to the portion of the comparative signal in the second portion of the composite signal. When the second light-combining component 212 splits the second composite signal such that the portion of the reference signal in the first portion of the second composite signal is phase shifted by 180° relative to the portion of the reference signal in the second portion of the second composite signal, the first light-combining component 211 also splits the composite signal such that the portion of the reference signal in the first portion of the composite signal is phase shifted by 180° relative to the portion of the reference signal in the second portion of the composite signal.

The first reference waveguide 210 and the second reference waveguide 208 are constructed to provide a phase shift between the first portion of the reference signal and the second portion of the reference signal. For instance, the first reference waveguide 210 and the second reference waveguide 208 can be constructed so as to provide a 90° phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 210 and the second reference waveguide 208 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

FIG. 7B provides a schematic of the relationship between the electronics and the light sensors in a processing component. The symbol for a photodiode is used to represent the first light sensor 223, the second light sensor 224, the first auxiliary light sensor 218, and the second auxiliary light sensor 220 but one or more of these sensors can have other constructions. In some instances, all of the components illustrated in the schematic of FIG. 7B are included on the LIDAR chip. In some instances, the components illustrated in the schematic of FIG. 7B are distributed between the LIDAR chip and electronics located off of the LIDAR chip.

The electronics connect the first light sensor 223 and the second light sensor 224 as a first balanced detector 225 and the first auxiliary light sensor 218 and the second auxiliary light sensor 220 from the same processing component as a second balanced detector 226. In particular, the first light sensor 223 and the second light sensor 224 are connected in series and the first auxiliary light sensor 218 and the second auxiliary light sensor 220 are connected in series. The serial connections in each of the first balanced detectors is in communication with a first data line 228 that carries the output from the first balanced detector as a first data signal. The serial connections in each of the second balanced detector is in communication with a second data line 232 that carries the output from the second balanced detector as a second data signal. The first data signals are each an electrical representation of a first composite signal and the second data signals are each an electrical representation of one of the second composite signals. Accordingly, each of the first data signals includes a contribution from a first waveform and a second waveform and the second data signal is a composite of the first waveform and the second waveform. The portion of the first waveform in a first data signal is phase-shifted relative to the portion of the first waveform in the second data signal but the portion of the second waveform in the first data signal is in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. Each of the first data signals and the second data signals are beating as a result of the beating between one of the comparative signal and the associated reference signal, i.e. the beating in the first composite signal and in the second composite signal.

Since a first data signal is an in-phase component and the associated second data signal its quadrature component, the first data signal and the associated second data signal together act as a complex data signal where the first data signal is the real component and the associated second data signal is the imaginary component of the input. The complex data signal is received at a LIDAR data generator 234 that processes the complex data signal so as to generate the LIDAR data (material indicator(s) and/or distance and/or radial velocity between the reflecting object and the LIDAR chip or LIDAR system).

Figure 7C:
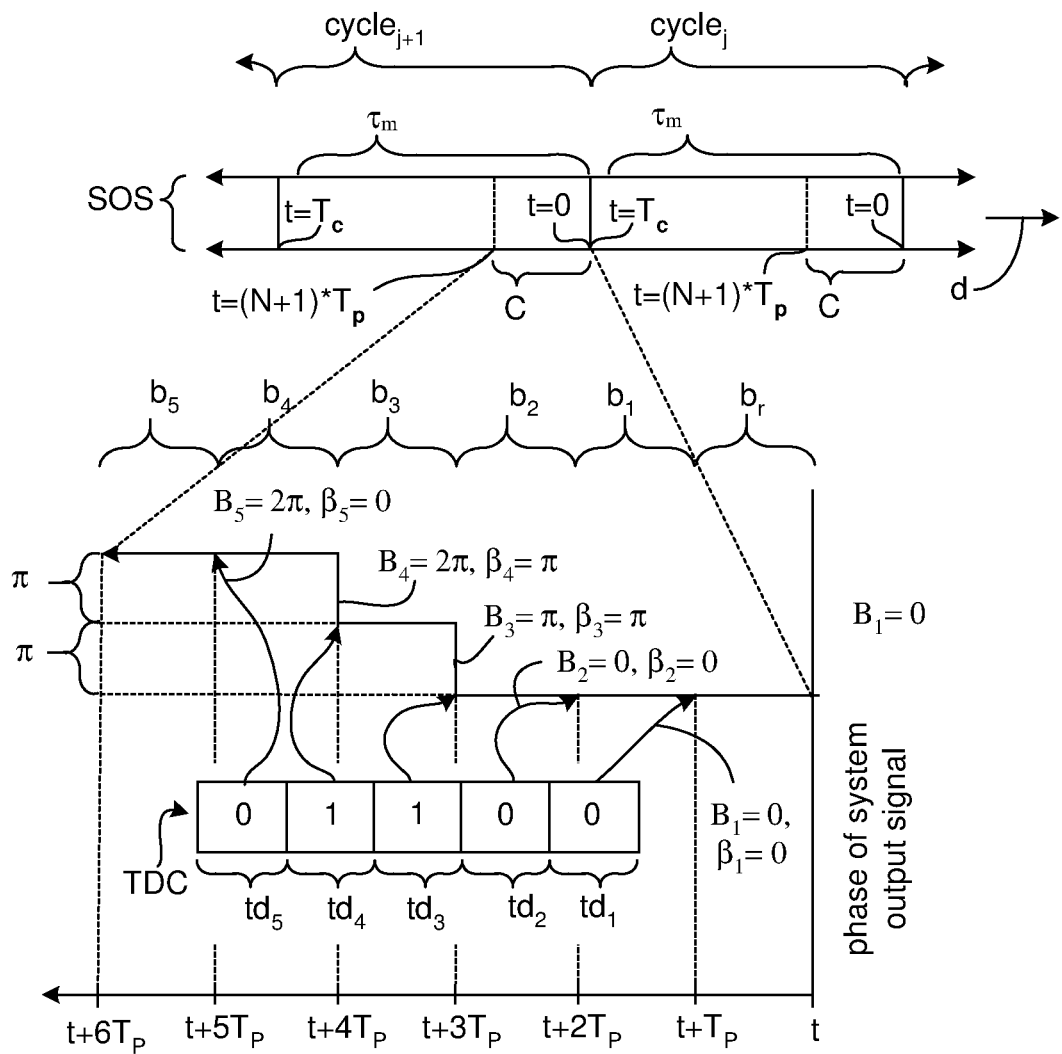
FIG. 7C is a diagram illustrating a LIDAR system output signal encoded with a binary code.

During operation of the LIDAR system, the electronics operate the light system 6 so the system output signal is output in a series of cycles. FIG. 7C shows two cycles labeled $cycle_j$ and $cycle_{j+1}$ over time. Each cycle can be associated with a sample region in a field of view. Accordingly, during a cycle, the LIDAR system outputs the system output signal that is used to generate the LIDAR data for the sample region that is illuminated by the system output signal during that cycle. When the system output signal is steered to different sample regions, different cycles can be associated with different sample regions. Accordingly, the LIDAR data generated from different cycles can be for different sample regions.

FIG. 7C also shows a system output signal (labeled SOS) transmitted during the cycles. The system output signal (SOS) is labeled as if it is traveling in the direction labeled d. During a code portion of each cycle (labeled C), the system output signal output signal transmitted from the LIDAR carries a binary code.

The code portion of each cycle is illustrated as being divided into N+1 bits. In FIG. 7C, the code portion of each cycle is illustrated as having 6 bits (N=5) for the purpose of simplifying the illustration and the following discussion.

The bits in the code portion of each cycle are each labeled $b_r$ or $b_n$ where n represents a bit index that is an integer. For the purposes of simplicity, the bit indices (n) illustrated in FIG. 7C have values of 1 through 5. The bit index can be assigned relative to time. For instance, as shown by the arrows labeled d in FIG. 7C, a lower bit index is output from the LIDAR system before a bit with a higher bit index. The bit with bit index one ($b_1$) can be the first bit carried by the system output signal at the start of the code portion of the cycle.

Each code portion bit has a duration labeled $T_p$. The transmission of the code portion of the system output signal can start at t=0 and end at $t=(N+1)*T_p$. Each cycle can occur over time t extending from t=0 to $T_c$.

The time required for a system output signal to exit the LIDAR system, travel the maximum distance for which the LIDAR system is configured to provide reliable LIDAR data and to return to the LIDAR system is labeled $\tau_m$ in FIG. 7C. The value of $t_c$ can be selected such that $t_c \geq \tau_m + (N+1)*T_p$ to allow the code portion of the system output signal time to returns to the LIDAR system before the start of the next cycle when the reflecting object is positioned at the maximum distance for which the LIDAR system is configured to provide reliable results.

In some instances, the electronics can operate the intensity modulator 16 so the transmission of the system output signal is stopped between the time $t=(N+1)*T_p$ and time $t=T_c$. Alternately, $(N+1)*T_p$ can be selected so the code portion is equal to $\tau_m$ or $T_c$. Accordingly, the system output signal can carry the code portion for the entire duration of the cycle or the entire duration of the maximum roundtrip duration ($\tau_m$). In these instances, the value of $t_c$ can be selected such that $t_c \geq \tau_m$.

In some instances, the bit durations ($T_p$) is $\leq 2*R/c$ where c represents the speed of light and R represents a range resolution that can be the min distinguishable distance between 2 adjacent targets. The range resolution (R) can be application specific. In some instances, the bit durations ($T_p$) is less than 10 ns or 5 ns. The number of bits for the code portion of a system output signal $(N)=t_c/T_p$ and $t_c \geq \tau_m$. In some instances, N is greater than 300, or 1000 and/or is less than 3000 or 10000. In an example where the maximum range is 200 m, N>1300.

During each cycle, the electronics operate the light system 6 such that the system output signal is encoded with a binary code during the code portion of the cycle. For instance, when a light system 6 includes the illustrated light source 8 and phase modulator 15, the electronics can operate the phase modulator 15 such that the system output signal is encoded with the binary code during the code portion of the cycle. Examples of a suitable binary code include, but are not limited to, m-sequence.

FIG. 7C includes an example of a binary code labeled TDC. The binary code is divided into N bits. Each of the N bits carries a digit from the binary code. The illustrated binary code includes N=5 bits and consists of 0s and 1s. For instance, the code illustrated in FIG. 7C is represented by 0, 1, 1, 0, 0. Equivalent versions of the code can also be used. For instance, a bi-polar version of a binary code uses only the digits 1 and −1. An example of an equivalent bi-polar representation of the binary code 0, 1, 1, 0, 0 can be 1, −1, −1, 1, 1.

The binary code is selected to have good autocorrelation properties. A code can be multiplied by a copy of the code to produce a numerical alignment indicator (autocorrelation value). The copy of the code can be a direct copy of the code or a different version of the code. When multiplying a code by the copy, the copy can be shifted relative to the code or can be unshifted relative to the code. When the copy is shifted relative to the code, the shift can be by one or more bits. When multiplying the code and the copy, each bit in the code is associated with one of the bits in the copy. When the copy is unshifted relative to the code, each bit from the code is associated with itself in the copy and the copy and the code are considered to be aligned. The shifting of the copy relative to the code changes the bits from the copy that are associated with the bits from the code.

During multiplication of the code and the copy, each bit from the code is multiplied by the associated bit in the copy and the results from each bit multiplication are added to provide the alignment indicator. The alignment indicator can be generated for multiple different shifts of copy relative including a shift of zero bits (alignment). As a result, a function indicating a value of the alignment indicator versus the number of bits for the shift can be generated. The sequence of digits in autocorrelated codes are selected such that the value of the alignment indicator peaks when the code and copy are aligned but is constant or substantially constant at lower values when the code and copy are not aligned. Examples of suitable codes are the codes that have been developed for wireless systems and exist in mature standards such as the global third generation (3G) wideband code division multiple access (CDMA) standards.

In some instances, the code is selected such that when the alignment indicator values are normalized to have a value from 0 to 1 with the alignment indicator at alignment having a value of 1, and when the copy is shifted away from alignment with the code in either or both directions by a number of bits called the shift number, the value of the alignment indicator is less than 0.1, or 0.05. The shift number can be greater than or equal to 1, 2, or 3. In some instances, this condition is maintained for each non-zero shift number in the code. In some instances, the value of the alignment indicator is less than 0.1 or 0.05 for each shift number greater than or equal to 1, 2, or 3 and/or less than 150 or 3000 when the copy is shifted by the shift number in one direction or both directions.

When a light system 6 includes the illustrated light source 8 and phase modulator 15, the electronics can operate the phase modulator 15 such that the code is carried in the phase of the system output signal. For instance, the phase of system output signal can be differential phase shifted according to the code using phase shift keying (PSK). In an example of differential phase shifting, the phase of the system output signal is changed by a first phase shift when the system output signal is to show a first digit of the binary code and is changed by a second phase shift when the system output signal is to show a second digit of the binary code. The amount of the first phase shift or the second phase shift can be zero degrees.

As an example, FIG. 7C illustrates the bits in the code portion of the system output signal encoded by differential phase shifting to carry the binary code labeled TDC. Encoding by differential phase shifting carries data at the interface between adjacent bits. There may not be a bit before the code portion bit $b_1$. As a result, a reference bit labeled $b_r$ is added to the bits in the code portion of the system output signal. The reference bit ($b_r$) can have a set value that is not a function of the digits in the binary code. In FIG. 7C, the reference bit labeled $b_r$ carries a value of 0 but it could carry a value of $\pi$.

To apply differential phase shift scheme to the binary code illustrated in FIG. 7C, the first digit can be 0 and the second digit can be 1. The first phase shift can be 0 rad and the second phase shift can be $\pi$ rad. As a result, the phase of the system output signal can be changed by 0 rad when the system output signal is to show a 0 and is changed by $\pi$ rad when the system output signal is to show a 1. An example of how the differential phase shift scheme is applied to a binary code is provided in FIG. 7C. FIG. 7C includes a graph showing the phase of the system output signal as function of time. The values of the first phase shift and the second phase shift are represented by an encoded phase shift labeled $\beta_n$ where n represents the bit index. Accordingly, $\beta_n$ can have a value of 0 (first phase shift) or $\pi$ (second phase shift). The variable labeled $B_n$ in FIG. 7C represents the cumulative value of the $\beta_n$ values up to bit index n. The binary code labeled TDC is placed on the graph to show how values in the slots of the binary code translate to the $\beta_n$ values.

The binary code slot labeled $td_1$ has a value of 0. As a result, the transition from bit $b_r$ to bit $b_1$ shows an encoded phase shift ($\beta_1$) of 0 radians. The binary code slot labeled $td_2$ has a value of 0. As a result, the transition from bit $b_1$ to bit $b_2$ shows an encoded phase shift ($\beta_2$) of 0 radians. The binary code slot labeled $td_3$ has a value of 1. As a result, the transition from bit $b_2$ to bit $b_3$ shows an encoded phase shift ($\beta_3$) of $\pi$ radians. The binary code slot labeled $td_4$ has a value of 1. As a result, the transition from bit $b_3$ to bit $b_4$ shows an encoded phase shift ($\beta_4$) of $\pi$ radians. The binary code slot labeled $td_5$ has a value of 0. As a result, the transition from bit $b_4$ to bit $b_5$ shows an encoded phase shift ($\beta_5$) of 0 radians.

Figure 7D:
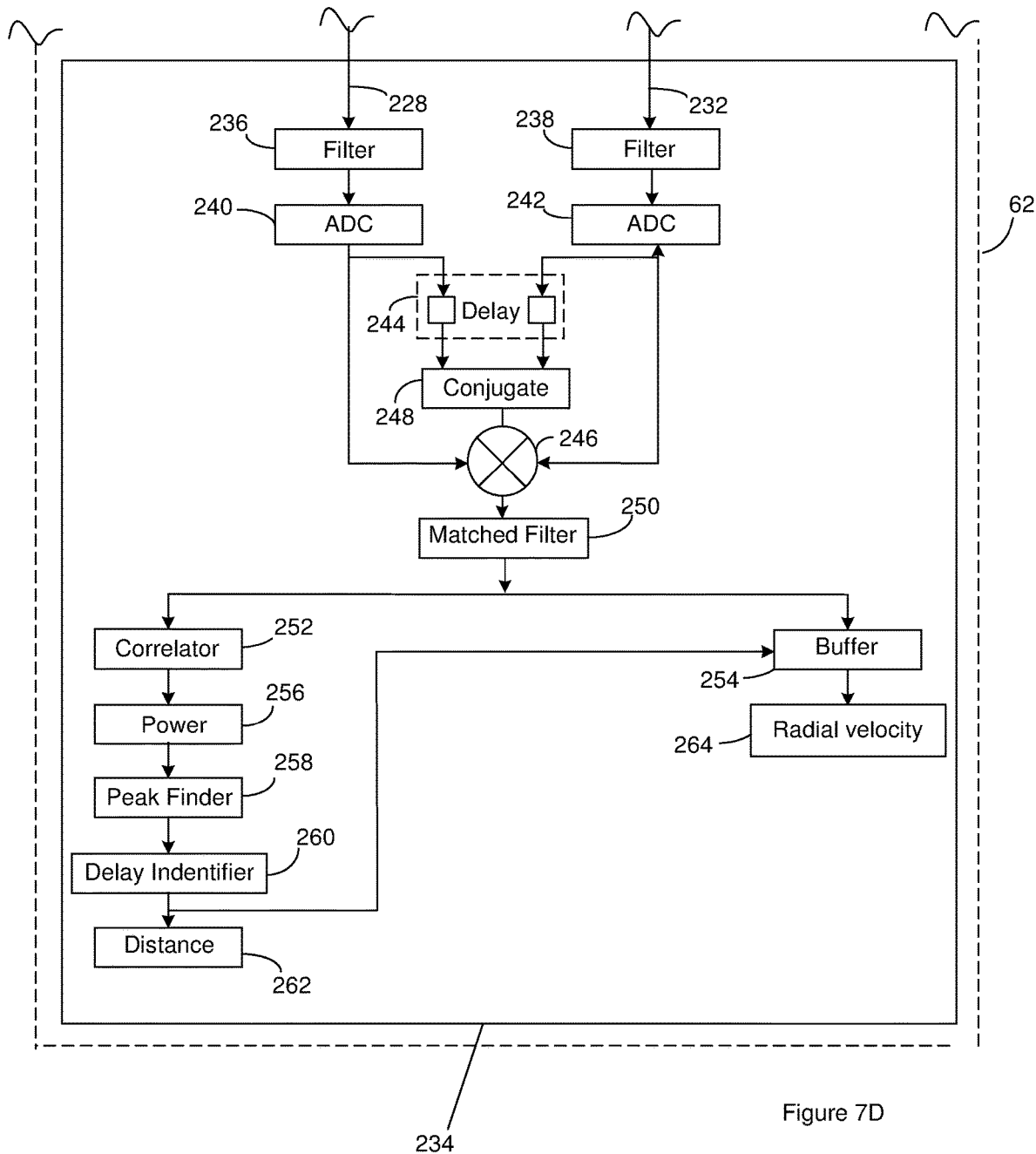
FIG. 7D is a schematic of a LIDAR data generator that is suitable for use with the LIDAR system.

FIG. 7D illustrates an example of a suitable LIDAR data generator 234. The LIDAR data generator 234 includes a first low pass filter 236 that receives the first data signal and outputs a first filtered signal. The LIDAR data generator 234 also includes a second low pass filter 238 that receives the second data signal and outputs a second filtered signal. The first low pass filter 236 and the second low pass filter 238 can be selected such that the first filtered signal and the second filtered signal are each centered at DC. The first filtered signal and the second filtered signal can serve as the real and imaginary components of a complex filtered signal.

The LIDAR data generator 234 includes a first Analog-to-Digital Converter (ADC) 240 that receives the first filtered signal and converts the first filtered signal from an analog form to a digital form and outputs a first digital data signal. The LIDAR data generator 234 includes a second Analog-to-Digital Converter (ADC) 242 that receives the second filtered signal and converts the second filtered signal from an analog form to a digital form and outputs a second digital data signal. To generate the digital forms of the filtered signals, the first Analog-to-Digital Converter (ADC) 240 and the second Analog-to-Digital Converter (ADC) 242 each periodically samples one of the filtered signals. As a result, the first digital data signal and the second digital data signal each carries a series of ADC samples of one of the filtered signals. As described above, the system output signal carries multiple bits of a code. As a result, the system return signal and the filtered signals each carry multiple bits. The sampling rate of the first Analog-to-Digital Converter (ADC) 240 and the second Analog-to-Digital Converter (ADC) 242 can be selected such that each bit in each of the filtered signals is sampled multiple times. Accordingly, the first digital data signal and the second digital data signal each carries multiple ADC samples from each bit of one of the filtered signals.

The first digital data signal is received at a delay 244 and a multiplier 246. The second digital data signal is also received at the delay 244 and the multiplier 246. The delay delays the first digital data signal by a delay period and outputs a delayed first digital data signal. The delay delays the second digital data signal by the delay period and outputs a delayed second digital data signal. The amount of the delay period can be equal to or substantially equal to the bit duration $T_p$.

The delayed first digital data signal and the delayed second digital data signal are received at a conjugator 248. The conjugator 248 generates the conjugate of the complex signal resulting from the delayed first digital data signal and delayed second digital data signal. The conjugator 248 outputs a conjugate signal that carries the conjugate of the delayed first digital data signal and delayed second digital data signal.

The multiplier receives the conjugate signal and multiplies the conjugate signal by the complex signal carried by the combination of the first digital data signal and the second digital data signal. Since the conjugate signal is generated from delayed signals but the digital data signal and the second digital data signal are not delayed, the multiplier multiplies a delayed signal by a non-delayed signal. Since the amount of delay can be equal to the bit duration ($T_p$), the delayed signal and the non-delayed signal are from adjacent bits. The multiplier outputs a code signal that carries a scaled and phase-rotated version of the code.

The code signal is received to a matched filter configured to convert the code signal from a square form to a triangular form. The matched filter is matched to the system output signal. For instance, the matched filter can convolve the code signal with a matched filter impulse response that is a square wave matched to the code signal.

A correlator 252 and a buffer 254 receive a convolved code signal from the matched filter. The correlator 252 multiples the binary code or an equivalent version of the binary code by the convolved code signal so as to generate an alignment indicator as described above. The alignment indicator is generated for multiple shifts of the convolved code signal to generate data indicating the value of the alignment indicator versus the degree of shifting between the binary code or an equivalent version of the binary code and the convolved code signal, i.e. versus the number of bits for the shift. The correlator outputs a correlation signal indicating the value of the alignment indicator versus the degree of shifting. As will become evident below, the alignment indicator can be a complex number.

The correlation signal is received by a power component 256 that generates a power signal that indicates a power level of the correlation signal versus the degree of shifting. For instance, the power component can calculate the value of $Re^2+Im^2$ from the alignment indicator were Re represents the real component of the alignment indicator and Im represents the imaginary component of the alignment indicator.

The power signal is received at a peak finder 258 that identifies a peak in the power signal that is a result of a system output signal being reflected by an object located outside of the LIDAR system. The output of the peak finder 258 is received at a delay identifier 260 that uses the identified peak to determine a roundtrip time for a system output signal that is reflected by the object to be transmitted from the LIDAR system and return to the LIDAR system. The output of the delay identifier 260 is received at the buffer 254 and also at a distance finder 262 that uses the roundtrip time to determine a distance between the LIDAR system and the reflecting object.

The electronics can use the contents of the buffer 254 to identify the portions of convolved code signal that correspond to the binary code. A velocity calculator receives the identified portion of the convolved code signal and uses the identified portion of the convolved code signal to determine a radial velocity between the LIDAR system and an object located outside of the LIDAR system.

Figure 7E:
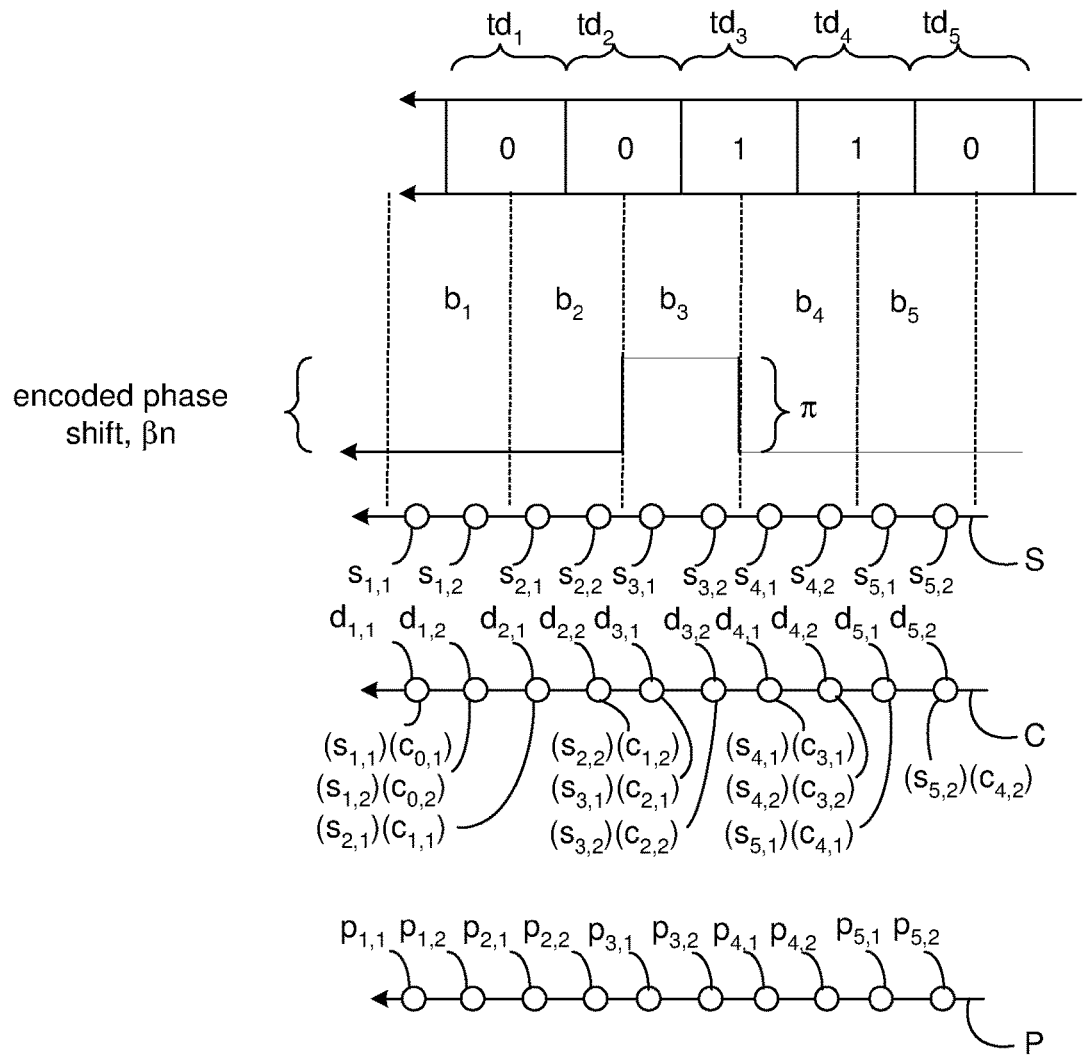
FIG. 7E illustrates the relationship between the bits of a binary code and signals that are processed by the LIDAR data generator.

As noted above, the system output signal carries data from a code arranged in a series of bits. As a result, the system return signal and the resulting complex filtered signal also carries this code arranged in the same series of bits. FIG. 7E includes an arrow labeled S that illustrates the complex filtered signal. To illustrate the portions the complex filtered signal that are associated with different bits, the code and phase versus bit pattern from FIG. 7C are copied into FIG. 7E. Each of the different bits is labeled $b_1$ through $b_5$ and is positioned over the portion of the complex filtered signal that carries the data from that bit. As discussed above, the illustrated bits are associated with the encoded phase shifts.

In FIG. 7E, the times where the first Analog-to-Digital Converter (ADC) 240 and the second Analog-to-Digital Converter (ADC) 242 sample the complex filtered signal are illustrated by the circles labeled $s_{n,k}$ where n is the bit index and k is an ADC sample index. The number of ADC samples per bit can be represented by M. In the illustrated example, the bits are sampled at a rate of twice per bit (M=2). The ADC samples are arranged in the complex filtered signal (labeled S) such that as time increases, the value of the bit index (n) stays constant while the value of the ADC sample index (k) increases from 1 to M. After the value of the ADC sample index (k) reaches M, the value of the bit index is increased by 1, the ADC sample index (k) is re-set to one and the sequence repeated.

The electronics can operate one or more optical components so as to provide the reference signal and the system output signal with the desired characteristics. For instance, the electronics can operate one or more components selected from a group consisting of the light system 6, phase modulator 15, and intensity modulator 16 such that the reference signal can be represented by $S_{ref}(t)=\cos(2\pi f_{co}t)$ and the system output signal can be represented by $S_{tx}(t)=\cos(2\pi f_{co}t+B_n)$ where $f_{co}$ represents the frequency of the system output signal and $B_n$ represents the cumulative encoded phase shift for the bit with bit index n as disclosed in the context of FIG. 7C. Because, the phase modulator 15 is located after the splitter 14 (see FIG. 1 and FIG. 2), the reference signal is not encoded with the binary code while the system output signal carries the binary code as is evident from the presence of the term $B_n$ in $S_{tx}(t)$.

When the reference signal and the system output signal are represented by $S_{ref}(t)$ and $S_{tx}(t)$, each ADC sample carried by the first digital data signal and the second digital data signal can be represented by $s_{n,k}=Ae^{j\Phi n}$ where A represents the amplitude and the j indicates a complex value (i.e. sqrt(−1)) and n represents the bit index. As a result, the ADC sample can also be represented by $A(\cos(\phi_n)+j^*\sin(\phi_n))$. The variable $\phi_n$ represents the phase during the ADC sample with bit n and can be determined from $\phi_n=\theta_0+\omega_d^*t+n^*\omega_d^*T_p+B_n$ where $\theta_0$ is a constant that can be zero, t represents time, $\omega_d$ is the Doppler frequency, n is bit index, $T_p$ represents the bit duration.

During the conjugation and multiplication performed by the multiplier 246 and conjugator 248, the code signal can be generated by multiplying the ADC sample $s_{n,k}$ by $c_{n-1,k}$, where $c_{n-1,k}$ represents the conjugate of the ADC sample $s_{n-1,k}$. As a result, the code signal can be represented by a series of CS samples represented by $d_{n,k}=A^2 e^{j\omega_d * T_p} e^{j\beta_n}$ where $\beta_n$ has a value of 0 radians or $\pi$ radians that can change in response to changes in the bit index n as discussed in the context of FIG. 7C. The code signal is labeled C in FIG. 7E. The circles on the code signal are each vertically aligned with a circle on the complex filtered signal. The vertically aligned circles correspond to the same ADC sample. The CS samples are arranged in the complex filtered signal (labeled S) such that as time increases, the value of the bit index (n) stays constant while the value of the value of the ADC sample index (k) increases from 1 to M. After the value of the ADC sample index (k) reaches M, the value of the bit index is increased by 1, the ADC sample index (k) is re-set to one and the sequence repeated.

The multiplication of the ADC sample by the conjugate of a previous ADC sample removes the $\omega_d^* t$ term that was present in phase ($\phi_n$) of the ADC samples ($s_{n,k}=Ae^{j\Phi n}$) from the CS samples ($d_{n,k}=A^2 e^{j\omega_d * T_P} e^{j\beta n}$) where $\omega_d$ represent a Doppler shift that induces sinusoids in the ADC as a result of LIDAR echoes. The use of differential phase keying combined with this multiplication removes this sine wave from the below LIDAR data solutions.

The matched filter receives the code signal and outputs the convolved code signal labeled P in FIG. 7F. Circles on the convolved code signal are each vertically aligned with a circle on the complex filtered signal. The circles on the code signal are each vertically aligned with a circle on the complex filtered signal. The vertically aligned circles correspond to the same ADC sample.

The matched filter is configured to convert the convolved code signal from a square form to a triangular form that is output from the matched filter as the convolved code signal. The convolved code signal (CCS) can carry a series of CCS samples represented by $p_{n,k}$ where n is the bit index and k is a sample index. The CCS samples are arranged in the convolved code signal (labeled P) such that as time increases, the value of the bit index (n) stays constant while the value of the value of the ADC sample index (k) increases from 1 to M. After the value of the ADC sample index (k) reaches M, the value of the bit index is increased by 1, the ADC sample index (k) is re-set to one and the sequence repeated.

Each $p_{n,k}$ is associated with one of the ADC samples. The value of CCS sample $p_{n,k}$ can be generated by convolving the code signal and the matched filter impulse response. In some instances, the filter impulse response is a square wave matched to the bit shape or pulse shape of the code signal. The code signal can be convolved with the matched filter impulse response to produce 2M-1 different convolution values for each of the bits. Each of the different convolution values can be labeled $v_{n,m}$ where n represents the bit index and m is an integer with a value is from 1 to 2M-1. The different convolution values can be generated by identifying the portion of the code signal associated with the CCS samples in the same bit. Below, the identified portion of the code signal is called the common bit portion. For instance, the CS samples $d_{2,1}$ and $d_{2,2}$ are associated with the same bit having bit index n=2. As a result, CS samples $d_{2,1}$ and $d_{2,2}$ represent a common bit portion of the code signal.

The common bit portion can be multiplied by the filter impulse response. For instance, the filter impulse can be a signal having a series of M samples represented by $f_q$ where q is an index for the filter impulse response index and extends from 1 to M. The different convolution values ($v_{n,m}$) for a single bit with value n can result from shifting the filter impulse response different degrees relative to the common bit portion and calculating the convolution value $v_{n,m}$ for each degree of shift. The shift can be by one or more CS samples and is done such that at least one CS sample in the common bit portion is associated with one of the filter impulse response. The shifting of the filter impulse response relative to the common bit portion changes the samples from the filter impulse response that are associated with the CS samples from the common bit portion.

During multiplication of the code and the filter impulse response, each CS sample from the common bit portion is multiplied by the associated sample from the filter impulse response and the results from each bit multiplication are added to provide the convolution values ($v_{n,m}$). When a CS sample from the common bit portion is not associated with a sample from the filter impulse response, the unassociated CS sample is multiplied by 0. When a sample from the filter impulse response is not associated with a CS sample from the common bit portion, the unassociated sample from the filter impulse response is multiplied by 0.

Each convolution value ($v_{n,m}$) is associated with one of the ADC samples. For instance, convolution value $v_{n,m}$ can be associated with ADC sample $s_{n,m}$. However, there are M-1 more convolution values than there are ADC samples associated with a bit, i.e. 2M-1 is greater than M. For convolution values with m>M, the convolution value ($v_{n,m}$) is associated with ADC sample ($s_{n+1,m-M}$). As a result, convolution values ($v_{n,m}$) from different bits can be associated with the same ADC sample. The convolution values associated with the same ADC sample are added together to get the value of the CCS sample $p_{n,k}$ associated with that ADC sample. When a single convolution value ($v_{n,m}$) is associated with an ADC sample, that convolution value serves as the value of the CCS sample ($p_{n,k}$) associated with that ADC sample.

FIG. 7F illustrates an example convolution. The example shows two ADC samples per bit, i.e. M=2. Accordingly, there are 2M-1=3 convolution values per bit and two filter impulse response samples represented by $f_1$ and $f_2$. The convolution values for bit n=1 and n=2 are shown and a portion of the convolution values for n=0 and n=3 are shown. Since the convolution values $v_{1,3}$ and $v_{2,1}$ are associated with the same ADC sample $p_{2,1}$; the values of $v_{1,3}$ and $v_{2,1}$ are added to determine that $p_{2,1}=v_{1,3}+v_{2,1}$.

The convolved code signal is received by the correlator 252. The correlator includes a first tapped delay line 300. The first tapped delay line 300 includes delay cells 302 that each receives one of the CCS samples ($p_{n,k}$). The correlator includes a second tapped delay line 304. The second tapped delay line 304 includes second delay cells 306 that each receives one of the CCS samples ($p_{n,k}$) from the first tapped delay line 300. The CCS samples ($p_{n,k}$) that the second delay cells 306 receive from the first tapped delay line 300 are separated by M-1 delay cells 302. For instance, the above illustration uses M=2 ADC samples per bit. As a result, the CCS samples ($p_{n,k}$) provided to the second tapped delay line 304 are separated by one delay cell.

Figure 7G:
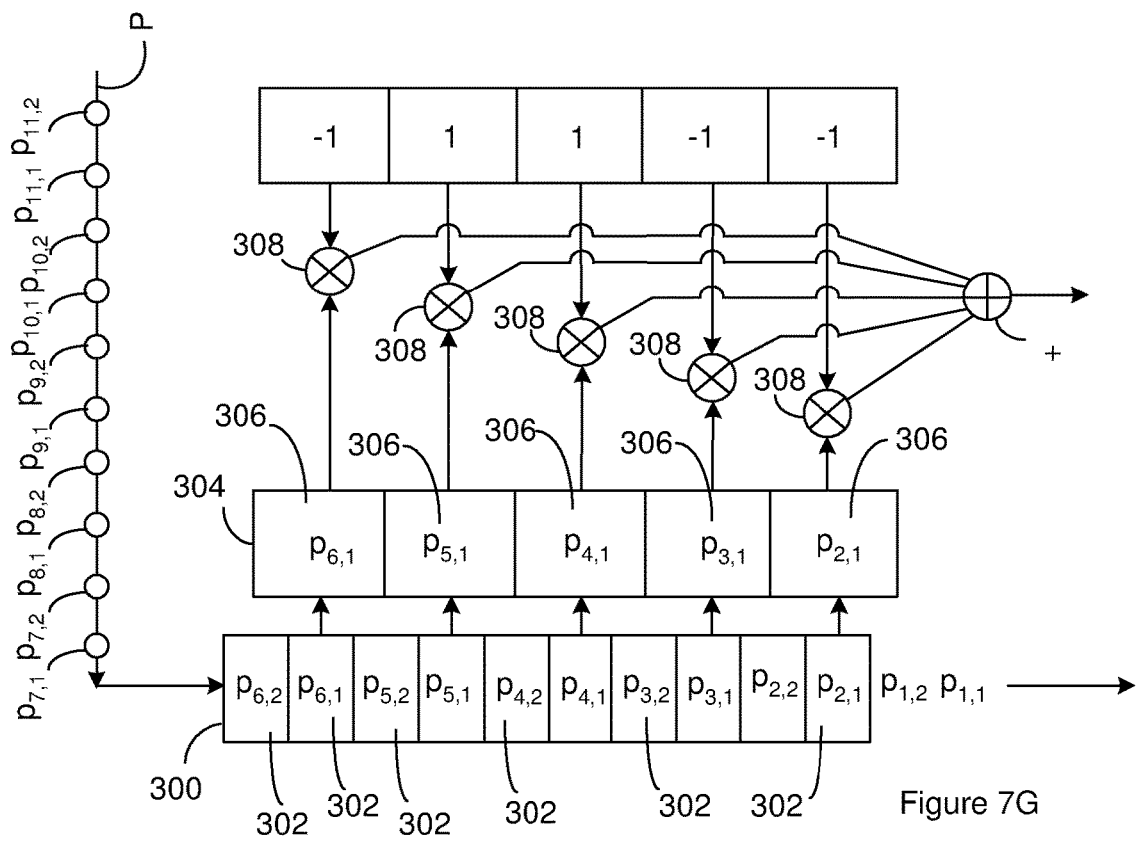
FIG. 7G is a schematic of a correlator.

The correlator 252 multiplies at least a portion of the bi-polar version of the binary code by the CCS samples ($p_{n,k}$) in the second delay cells 306. FIG. 7G shows a portion of the bi-polar version of the binary code for the purposes of simplicity. Each digit in the binary code is associated with one of the second delay cells 306 as shown in FIG. 7G. The correlator 252 includes several multipliers 308 that each multiplies one of the digits from the binary code by the contents of the associated second delay cell 306. The correlator also includes an adder 310 that adds the multiplication results so as to generate the alignment indicator.

After generating an alignment indicator, the CCS samples ($p_{n,k}$) in the delay cells 302 are each shifted in the same direction by the same amount. For instance, the CCS samples ($p_{n,k}$) in the delay cells 302 can each be shifted by one or more cells within the first tapped delay line 300. In some instances, the CCS samples ($p_{n,k}$) in the delay cells 302 are each shifted by a single cell. As a result, one or more CCS samples ($p_{n,k}$) exits first tapped delay line 300 and one or more CCS samples ($p_{n,k}$) enters the first tapped delay line 300 from the convolved code signal. The changing of the CCS samples ($p_{n,k}$) in the delay cells 302 leads to a change in the CCS samples ($p_{n,k}$) in the second delay cells 306. The multipliers 308 each multiplies the digits from the binary code by the contents of the associated second delay cell 306 and the adder 310 adds the multiplication results.

The convolved code signal that carries the CCS samples ($p_{n,k}$) carries a version of the binary code because the $p_{n,k}$ values are a product of $d_{n,k}=A^2 e^{j\omega_d * T_p} e^{j\beta_n}$ values where the $\beta_n$ have values that correspond to the digits of the binary code. For instance, the $\beta_n$ values of 0 radians can correspond to binary code values of 0 and $\beta_n$ values of $\pi$ radians can correspond to binary code values of 1. As a result, the multiplication of the bi-polar version of the binary code by the convolved code signal is effectively a multiplication of two different versions of the binary code. As a result, an alignment indicator results from the multiplications and addition performed by the multipliers 308 and adder 310. Accordingly, the adder 310 outputs the alignment indicator. The CCS samples ($p_{n,k}$) in the second delay cells 306 are shifted again and yet another alignment indicator is generated.

The process of shifting the CCS samples ($p_{n,k}$) in the second delay cells and generating an alignment indicator is repeated so as to generate data indicating the value of the alignment indicator as a function of time. As a result, the correlation signal output from the correlator indicates a series of alignment indicators that can each be represented by $a_q$ where q is an alignment indicator index. The series of alignment indicator values in the correlation signal indicates the value of the alignment indicator versus the degree of shifting.

The correlation signal is received by a power component 256. The power outputs a power signal that indicates a power level of the correlation signal versus the degree of shifting. For instance, the power component can calculate the value of $Re^2+Im^2$ for all or a portion of the alignment indicators ($a_q$) where Re represents the real component of the alignment indicator $a_q$ and Im represents the imaginary component of the alignment indicator $a_q$. Accordingly, a value of $Re^2+Im^2$ can be generated for the values of the alignment indicators ($a_q$) in the correlation signal. The determination of $Re^2+Im^2$ removes the $\omega_d * T_p$ term that is present in the phase ($\phi_n$) of the samples ($s_{n,k}=Ae^{j\Phi n}$) from the calculation of the LIDAR data.

Figure 7H:
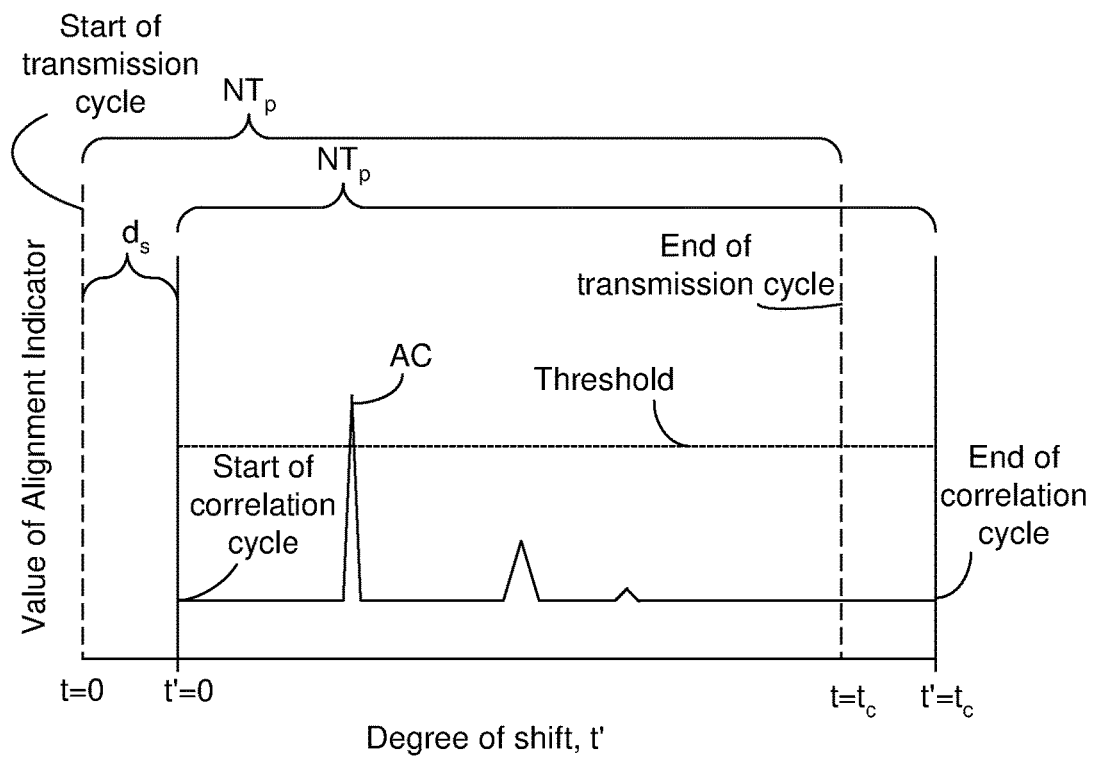
FIG. 7H is a graph showing that includes an example of the power signal versus time.

FIG. 7H is a graph showing that includes an example of the power signal versus time. Accordingly, the graph includes a curve showing the value of the alignment indicators ($a_q$) versus time. The graph includes a location labeled "start of transmission cycle" and a location labeled "end of transmission cycle." The "start of transmission cycle" can indicate the start of a transmission cycle such as the cycle disclosed in the context of FIG. 7C. As a result, the "start of transmission cycle" can indicate when the system output signal carrying bit $b_1$ is transmitted from the LIDAR system. The "end of transmission cycle" can indicate the end of the transmission cycle at time $t=t_c$. The graph also includes a location labeled "start of correlation cycle" and a location labeled "end of correlation cycle." The "start of correlation cycle" can indicate when the CCS sample ($p_{1,1}$) enters the second delay cells 306. The "end of cycle" can indicate when the CCS sample ($p_{N,M}$) enters the second delay cells 306. In some instances, the duration of the correlation cycle is equal to the duration of the transmission cycle so the data from sequential transmission cycles can be calculated in series.

There is a system delay labeled $d_s$ between the "start of transmission cycle" and the "start of correlation cycle." The system delay ($d_s$) can be the result of delays from one or more sources selected from the group consisting of delays in electronics such as a delay caused by the matched filter, delays from other sources, and/or delays induced by the system or system operator.

The degree of shifting shown on the x-axis can be represented by the number of CCS sample ($p_{n,k}$) shifts that occur after the shift where the CCS sample $p_{1,1}$ enters the second delay cells 306. The time increases with increasing numbers of shifts and the time increase can be linear or substantially linear. As a result, the degree of shifting can also represent correlation time (t') where the correlation time (t') is equal to 0 at the "start of correlation cycle." When the duration of the correlation cycle is equal to the duration of the transmission cycle, the correlation time (t') can be equal to $t_c$ at the "end of correlation cycle."

The power signal includes a peak labeled AC. The AC peak is a result of the convolved code signal that carries the CCS samples ($p_{n,k}$) carrying a version of the binary code. Since the binary code has good autocorrelation properties and the convolved code signal carries a version of the binary code, the CCS samples ($p_{n,k}$) in the convolved code signal have similar autocorrelation properties. A characteristic of good autocorrelation properties is that the alignment indicators peak when different versions of the code are aligned. Since the power signal values are derived from the alignment indicators provided by the convolved code signal, the power signal also shows a peak when there is alignment between the CCS samples ($p_{n,k}$) carried in convolved code signal and the bi-polar version of the binary code. Accordingly, the peak labeled AC in FIG. 7H corresponds to alignment between the bi-polar version of the binary code and the code carried in the convolved code signal.

The power signal is received at the peak finder 258. As is shown in FIG. 7H, the power signal can include one or more peaks that are a result of noise and/or other reflecting objects in the power signal. The peak finder is configured to identify one or more peaks in the power signal with a power level above a noise threshold. Each peak above the noise threshold results from the system output signal being reflected by an object located outside of the LIDAR system. When the (md term is not removed from the results, the associated sinusoid increases the difficulty of finding these peaks. The elimination of this sinusoid from the results increases the accuracy of the peak identification. Suitable peak finders 258 include, but are not limited to, peak finding algorithms.

The output of the peak finder 258 is received at the delay identifier 260. The delay identifier 260 determines the value of the correlation time (t') at the identified peak. When the duration of the correlation cycle is equal to the duration of the transmission cycle, the value of the correlation time (t') when alignment occurs between the convolved code signal and the bipolar version of the two-digit signal represents or substantially represents the amount of delay between the code being transmitted from the LIDAR system and returning to the LIDAR system. Accordingly, the delay identifier 260 can output a signal indicating time for the system output signal to be transmitted from the LIDAR system, be reflected by an object in the path of the system output signal, and return to the LIDAR system (the roundtrip time).

The output from the delay identifier 260 is received at a distance finder 262 and the buffer 254. The distance finder 262 can use the roundtrip time to determine the distance between the LIDAR system and the object in the path of the system output signal. The distance can be determined from distance=$c*t_r/2$ where c represents the speed of light and $t_r$ represents the roundtrip time received from the delay identifier 260.

The buffer 254 can store the convolved code signal. The electronics can use the roundtrip time to identify the CCS samples ($p_{n,k}$) in the convolved code signal that provided the alignment between the convolved code signal and the bipolar version of the two-digit signal. The CCS samples ($p_{n,k}$) identified from the convolved code signal are received by a radial velocity calculator 264. The radial velocity calculator 264 can multiply each of the identified CCS samples by the associated digit from the bi-polar version of the code and add the multiplication results to generate a velocity factor that is associated with the identified CCS samples. The resulting velocity factor is an exponential whose phase is related to the target Doppler frequency. The radial velocity calculator 264 can take the inverse tangent of the velocity factor to generate a value of $\omega_d * T_p$. The radial velocity calculator 264 can then determine the radial velocity from $v = \omega_d * \lambda/(4\pi)$ where v is the radial velocity between the LIDAR system and the reflecting object and $\lambda$ is the wavelength of the system output signal.

As noted above, the power signal versus time graph shown in FIG. 7H may have multiple peaks that are above the noise threshold as a result of the system output signal being reflected by multiple objects. As a result, the delay identifier 260 may output multiple roundtrip times that are each associated with a different one of the objects. The LIDAR system can be configured to generate LIDAR data for each of the different objects. For instance, the electronics can include multiple distance finders 262 that each determines the distance between the object and the LIDAR system for one of the objects and/or multiple velocity calculator 264 that each determines a radial velocity between the object and the LIDAR system for one of the objects. Additionally or alternately, the electronics can include a distance finder 262 that serially determines the distance between one of the objects and the LIDAR system for two or more of the objects and/or a velocity calculator 264 that serially determines the radial velocity between one of the object and the LIDAR system for two or more of the objects.

As is evident from the above discussions, in some instances, a single electrical line illustrated above carries a complex signal.

Figure 8:
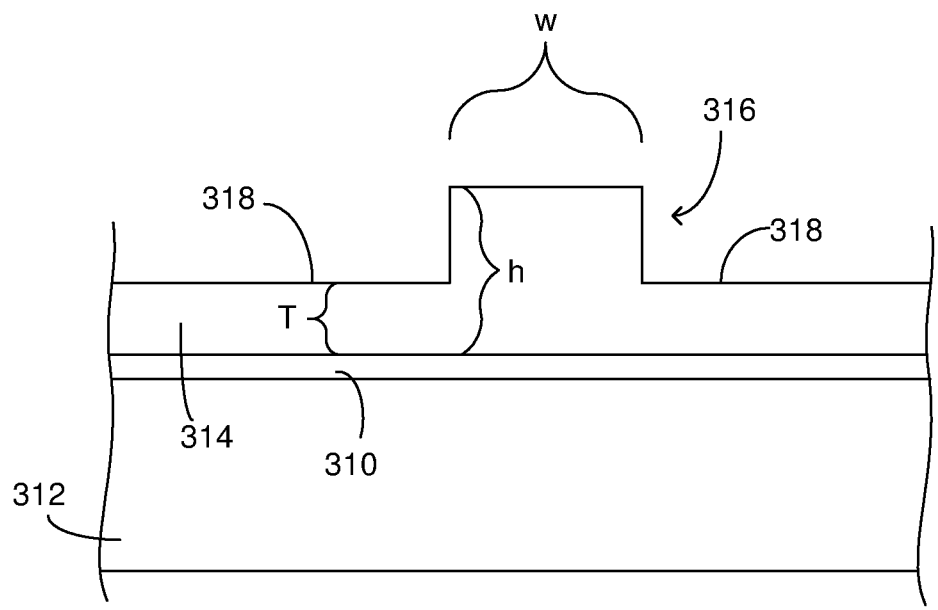
FIG. 8 is a cross-section of portion of a LIDAR chip constructed from a silicon-on-insulator wafer.

Suitable platforms for the LIDAR chips include, but are not limited to, silica, indium phosphide, and silicon-on-insulator wafers. FIG. 8 is a cross-section of portion of a LIDAR chip constructed from a silicon-on-insulator wafer. A silicon-on-insulator (SOI) wafer includes a buried layer 310 between a substrate 312 and a light-transmitting medium 314. In a silicon-on-insulator wafer, the buried layer 310 is silica while the substrate 312 and the light-transmitting medium 314 are silicon. The substrate 312 of an optical platform such as an SOI wafer can serve as the base for the entire LIDAR chip. For instance, the optical components shown on the above LIDAR chips can be positioned on or over the top and/or lateral sides of the substrate 312.

FIG. 8 is a cross section of a portion of a LIDAR chip that includes a waveguide construction that is suitable for use in LIDAR chips constructed from silicon-on-insulator wafers. A ridge 316 of the light-transmitting medium extends away from slab regions 318 of the light-transmitting medium. The light signals are constrained between the top of the ridge 316 and the buried oxide layer 310.

The dimensions of the ridge waveguide are labeled in FIG. 8. For instance, the ridge has a width labeled w and a height labeled h. A thickness of the slab regions is labeled T. For LIDAR applications, these dimensions can be more important than other dimensions because of the need to use higher levels of optical power than are used in other applications. The ridge width (labeled w) is greater than 1 µm and less than 4 µm, the ridge height (labeled h) is greater than 1 µm and less than 4 µm, the slab region thickness is greater than 0.1 µm and less than 3 µm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 µm and less than 0.5 µm. While the above dimensions will generally provide the straight or substantially straight portions of a waveguide with a single-mode construction, they can result in the tapered section(s) and/or curved section(s) that are multimode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction disclosed in the context of FIG. 8 is suitable for all or a portion of the waveguides on above LIDAR chips.

Light sensors that are interfaced with waveguides on a LIDAR chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the LIDAR chip. Alternately, all or a portion the waveguides that terminate at a light sensor can terminate at a facet located at an edge of the chip and the light sensor can be attached to the edge of the chip over the facet such that the light sensor receives light that passes through the facet. The use of light sensors that are a separate component from the chip is suitable for all or a portion of the light sensors selected from the group consisting of the first light sensor and the second light sensor.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10, 2012; U.S. Pat. No. 8,242,432, issued Aug. 14, 2012; and U.S. Pat. No. 6,108,8472, issued on Aug. 22, 2000 each of which is incorporated herein in its entirety. The use of light sensors that are integrated with the chip are suitable for all or a portion of the light sensors selected from the group consisting of the first light sensor and the second light sensor.

Suitable electronics can include, but are not limited to, a controller that includes or consists of analog electrical circuits, digital electrical circuits, processors, microprocessors, digital signal processors (DSPs), Field Programmable Gate Arrays (FPGAs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Although the LIDAR system is disclosed in the context of code division multiplexing with a binary code, the LIDAR system can use multi-digit codes with more than two digits. For instance, the LIDAR system can use quadrature phase shift keying to encode the system output signal.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A LIDAR system, comprising:
   an output component that transmits a system output signal from the LIDAR system;
   electronics that operate one or more components such that the system output signal carries a binary code, and
      the electronics being configured to identify an amount of delay between the binary code being transmitted from the LIDAR system and returning to the LIDAR system after being reflected by an object located outside of the LIDAR system, and
      the binary code being selected such that an alignment indicator can be determined by an autocorrelation calculation where bits in a copy of the binary code are each multiplied by an associated bit in the binary code and results of the multiplications are added,
      the binary code being selected such that when the alignment indicator values are normalized to have a value from 0 to 1 with the alignment indicator having a value of 1 when the copy and the binary code are aligned but when the copy is shifted away from alignment with the binary code by a number of bits called the shift number, the value of the alignment indicator is less than 0.1 for each shift number greater than or equal to 3 and less than 150, and
      an association between bits in the copy and bits in the binary code being such that the bits in the binary code are associated with themselves in the copy when the copy and the binary code are aligned but the association between the bits in the copy and bits in the binary code shifts by the shift number when the copy is shifted away from alignment with the binary code.

2. The LIDAR system of claim 1, wherein the binary code is an m-sequence code.

3. The LIDAR system of claim 1, wherein a phase of the system output signal carries the binary code.

4. The LIDAR system of claim 3, wherein the binary code is encoded into the phase of the system output signal by differential phase shift keying.

5. The LIDAR system of claim 1, wherein the system output signal includes multiple bits that is each associated with one of the digits from the binary code.

6. The LIDAR system of claim 5, wherein a duration of each bit is less than 10 ns.

7. The LIDAR system of claim 1, wherein the electronics are configured to use the identified time to generate LIDAR data indicating a distance and/or radial velocity between the LIDAR system and the object.

8. The LIDAR system of claim 1, wherein signals from which the delay is determined include a series of values that are each generated by combining results from multiple different bits from the binary code.

9. The LIDAR system of claim 1, wherein the system output signal carries the binary code such that the system output signal carries is code division multiplexed.

10. A method of operating a LIDAR system, comprising:
    encoding a system output signal with a binary code
       the binary code being selected such that an alignment indicator can be determined by an autocorrelation calculation where bits in a copy of the binary code are multiplied by bits in the binary code and results of the multiplications are added,
       the binary code being selected such that when the alignment indicator values are normalized to have a value from 0 to 1 with the alignment indicator having a value of 1 when the copy and the binary code are aligned but when the copy is shifted away from alignment with the binary code by a number of bits called the shift number, the value of the alignment indicator being less than 0.1 for each shift number greater than or equal to 3 and less than 150, and
       an association between bits in the copy and bits in the binary code being such that the bits in the binary code are associated with themselves in the copy when the copy and the binary code are aligned but the association between the bits in the copy and bits in the binary code shifts by the shift number when the copy is shifted away from alignment with the binary code; and
    identifying an amount of time between the binary code being transmitted from the LIDAR system and returning to the LIDAR system after being reflected by an object located outside of the LIDAR system.

11. The method of claim 10, wherein the binary code is an m-sequence code.

12. The method of claim 10, wherein a phase of the system output signal carries the binary code.

13. The method of claim 12, wherein the binary code is encoded into the phase of the system output signal by differential phase shift keying.

14. The method of claim 11, wherein the system output signal includes multiple bits that is each associated with one of the digits from the binary code.

15. The method of claim 14, wherein a duration of each bit is less than 10 ns.

16. The method of claim 10, further comprising: generating LIDAR data that indicates a distance and/or radial velocity between the LIDAR system and the object.

17. The method of claim 10, wherein signals from which the delay is determined include a series of values that are each generated by combining results from multiple different bits from the binary code.

* * * * *